United States Patent
Kanazawa et al.

(10) Patent No.: US 7,019,851 B2
(45) Date of Patent: Mar. 28, 2006

(54) IMAGE FORMING APPARATUS, IMAGE FORMING SYSTEM, SHEET FEEDING SOURCE DESIGNATION CONTROL METHOD, IMAGE FORMATION CONTROL METHOD, AND STORAGE MEDIA

(75) Inventors: Toshiya Kanazawa, Tokyo (JP); Akio Suzuki, Tokyo (JP); Satoshi Ookuma, Kanagawa (JP)

(73) Assignee: Canon Kabushiki Kaisha, (JP)

( * ) Notice: Subject to any disclaimer, the term of this patent is extended or adjusted under 35 U.S.C. 154(b) by 997 days.

(21) Appl. No.: 09/792,645

(22) Filed: Feb. 23, 2001

(65) Prior Publication Data

US 2002/0051161 A1    May 2, 2002

(30) Foreign Application Priority Data

Feb. 24, 2000 (JP) ............................. 2000-047414
Feb. 24, 2000 (JP) ............................. 2000-047415

(51) Int. Cl.
*G06F 15/00* (2006.01)
(52) U.S. Cl. ...................... 358/1.12; 358/358; 358/498
(58) Field of Classification Search ............. 358/1.12, 358/498; 399/370, 371, 392, 82, 81, 45; 271/9.09; 101/40, 40.1, 43, 44
See application file for complete search history.

(56) References Cited

U.S. PATENT DOCUMENTS 5,598,271 A * 1/1997 Ohtani ..................... 358/296
5,826,156 A * 10/1998 Natsume et al. ............ 399/389
6,741,269 B1 * 5/2004 Morikawa .................. 715/781

* cited by examiner

*Primary Examiner*—Twyler Lamb
(74) *Attorney, Agent, or Firm*—Rossi, Kimms & McDowell, LLP

(57) ABSTRACT

There are provided an image forming apparatus, an image forming system, and a sheet feeding source designation control method, which are capable of preventing a user from failing to carry out proper settings to thereby avoid printing using an undesired sheet cassette, and also capable of allowing a user to change to another type of sheet feeding than manual feeding immediately if he or she desires to do so, and storage media storing programs for executing the methods. The size of at least one sheet for manual feeding can be designated by a device or a job. It is determined whether or not a manual feed tray can be designated as a sheet feeding source if the sheet size is designated by the device or the job, and the manual feed tray is designated as the sheet feeding source when it is so determined. A sheet selecting screen is displayed on a screen for allowing a user to confirm or change the designation of the manual feed tray as the sheet feeding source upon completion of the designation, if the size is designated by the device or the job.

42 Claims, 17 Drawing Sheets

IMAGE FORMING APPARATUS, IMAGE FORMING SYSTEM, SHEET FEEDING SOURCE DESIGNATION CONTROL METHOD, IMAGE FORMATION CONTROL METHOD, AND STORAGE MEDIA

BACKGROUND OF THE INVENTION

1. Field of the Invention

The present invention relates to an image forming apparatus including an operating means for designating the size of sheets for manual feeding as a device or a job, and/or a reserved printing function that accepts reservations made for subsequent image forming jobs during image formation, an image forming system, a sheet feeding source designation control method, an image formation control method, and storage media storing programs for executing the methods.

2. Related Art

An image forming apparatus is known, which includes means for designating the size of sheets for manual feeding as a device (manual sheet feeder type designating means), means for designating the size of sheets for manual feeding as a job (designating means through an operation panel), and means for designating manual feeding as a method of feeding sheets used for copying originals, and performing copying operations based on instructions given by these means (first prior art).

On the other hand, of various functions performed by an image forming apparatus, reserved copying is known, wherein a next process of inputting images is executed during printing in order to perform print jobs efficiently. Further, with respect to settings for performing printing, the conventional image forming apparatus enables users to use types of sheets requiring respective different processes, such as an OHP sheet and a thick sheet, in addition to an ordinary sheet, by providing settings corresponding respectively to such different processes (second prior art). In the conventional image forming apparatus, a print job is executed based on the user's designation of a sheet cassette through which a sheet or sheets are to be supplied.

However, the above conventional image forming apparatuses have the following problems: In the first prior art, a print job using manual feeding needs designating a sheet size for manual feeding by using the manual feeding sheet size designating means, and designating a sheet cassette by using the manual feeding designating means. When the user considers by mistake that he or she has selected the sheet cassette together with the sheet size upon designation of the sheet size, i.e. when the user has designated only the sheet size, but not the sheet cassette, the image forming apparatuses may sometimes execute the print job using sheets fed through an undesired sheet cassette.

Further, in the second prior art, as mentioned above, a print job is executed based on the user's designation of a sheet cassette through which a sheet or sheets are to be supplied. To execute a print job using a sheet or sheets from a manual feed tray mounted on the image forming apparatus, for example, the user cannot designate the size and type of sheet for printing jobs to be reserved, and determines whether or not a sheet or sheets are on the manual feed tray when he or she sets each print job. This makes it difficult for the image forming apparatus to smoothly execute different manners of printing through manual feeding (for example, printing processes including manual feeding of A-size ordinary sheets, and special sheets such as postcards and OHP sheets) according to a plurality of print jobs.

SUMMARY OF THE INVENTION

It is a first object of the invention to provide an image forming apparatus, an image forming system, and a sheet feeding source designation control method, which are capable of preventing a user from failing to carry out proper settings to thereby avoid printing using an undesired sheet cassette, and also capable of allowing a user to change to another type of sheet feeding than manual feeding immediately if he or she desires to do so, and storage media storing programs for executing the methods.

It is a second object of the invention to provide an image forming apparatus, an image forming system, an image formation control method, which are capable of smoothly executing printing through manual feeding in different manners according to a plurality of printing jobs, whereby the printing can be performed efficiently, and storage media storing programs for executing the methods.

To attain the first object, in a first aspect of the present invention, there is provided an image forming apparatus for forming images on sheets based on an image input operation, comprising manual sheet feeding means for manually feeding sheets, first sheet designating means for designating a size of at least one sheet for manual feeding as a device, second sheet designating means for designating a size of at least one sheet for manual feeding as a job, sheet storing means for storing the at least one sheet having the size designated by the device or the job, display means for displaying screens, and control means for determining whether or not the manual sheet feeding means can be designated as a sheet feeding source if the size is designated by the device or the job, designating the manual sheet feeding means as the sheet feeding source when it is so determined, and displaying, on the display means, a sheet selecting screen for allowing a user to confirm or change the designation of the manual sheet feeding means as the sheet feeding source upon completion of the designation, if the size is designated by the device or the job.

In a preferred form of the first aspect, the image forming apparatus comprises image input means for inputting image data, image storing means for sequentially storing the image data input by the image input means, image output means for reading the image data stored in the image storing means to sequentially form images on sheets and output same, and setting means for setting a processing mode for processing the image data stored in the image storing means, and wherein the control means causes the image storing means to sequentially store the image data input by the image input means, and causes the image output means to sequentially form and output the images.

Preferably, the control means causes the image output means to form and output images in a manner according to the size of the at least one sheet and a type thereof.

Typically, the processing mode comprises a mode for implementing at least one function performed by the image forming apparatus, the sheet size includes regular A sizes including A3 and A4, regular B sizes including B4 and B5, and inch-based sizes, and the sheet type includes plain sheet, thick sheet, and OHP sheet.

The image forming apparatus according to the first aspect is applicable to a copying machine having a copying function of reading images from originals to form images on sheets, comprising image reading means for reading images from originals, and interface means for performing data communication with external apparatuses.

The image forming apparatus according to the first aspect is also applicable to a printing apparatus including a printer, having a printing function of forming images on sheets, comprising interface means for performing data communication with external apparatuses.

The image forming apparatus according to the first aspect is further applicable to a complex copying machine having a copying function, a printing function, and a facsimile function, comprising image reading means for reading images from originals, facsimile communication means for performing data communication via a telephone line, and interface means for performing data communication with external apparatuses.

According to the image forming apparatus of the first aspect, when a user designates a sheet size for manual feeding, it is determined that a request for printing through manual feeding of a sheet or sheets has been made, and then a sheet cassette for feeding the sheet or sheets is changed to the manual sheet feeding means, to thereby prevent the user from failing to carry out proper settings and hence avoid printing using an undesired sheet cassette. Further, in order to confirm the automatic change to the manual sheet feeding means, the sheet selecting screen is displayed for allowing the user to confirm or change the designation of the manual sheet feeding means as the sheet feeding source upon completion of the designation. Furthermore, the user can change the sheet feeding manner to another type of sheet feeding than manual feeding immediately if he or she desires to do so.

To attain the first object, in a second aspect of the present invention, there is provided an image forming system which comprises an image forming apparatus having manual sheet feeding means for manually feeding sheets, for forming images on sheets based on an image input operation, and an external apparatus capable of data communication with the image forming apparatus, wherein the image forming apparatus comprises manual sheet feeding means for manually feeding sheets, first sheet designating means for designating a size of at least one sheet for manual feeding as a device, second sheet designating means for designating a size of at least one sheet for manual feeding as a job, sheet storing means for storing the at least one sheet having the size designated by the device or the job, display means for displaying screens, and control means for determining whether or not the manual sheet feeding means can be designated as a sheet feeding source if the size is designated by the device or the job, designating the manual sheet feeding means as the sheet feeding source when it is so determined, and displaying, on the display means, a sheet selecting screen for allowing a user to confirm or change the designation of the manual sheet feeding means as the sheet feeding source upon completion of the designation, if the size is designated by the device or the job, and wherein the external apparatus has a function of transmitting code data representing images to said image forming apparatus.

According to the image forming system of the second aspect, the image forming system comprises the image forming apparatus having a function of designating the sheet feeding source and the external apparatus, similarly to the first aspect, and it is therefore possible to prevent the user from failing to carry out proper settings and hence avoid printing using an undesired sheet cassette, and also, the user can change the sheet feeding manner to another type of sheet feeding than manual feeding immediately if he or she desires to do so.

To attain the first object, in a third aspect of the present invention, there is provided a method of controlling designation of a sheet feeding source applied to an image forming apparatus having manual sheet feeding means for manually feeding sheets, for forming images on the sheets based on an image input operation, the method comprising a first sheet designating step of designating a size of at least one sheet as a device, a second sheet designating step of designating a size of at least one sheet as a job, a sheet storing step of storing the at least one sheet having the size designated by the device or the job, and a control step of determining whether or not the manual sheet feeding means can be designated as a sheet feeding source if the size is designated by the device or the job, designating the manual sheet feeding means as the sheet feeding source when it is so determined, and displaying a sheet selecting screen for allowing a user to confirm or change the designation of the manual sheet feeding means as the sheet feeding source upon completion of the designation, if the size is designated by the device or the job.

According to the sheet feeding source designating method of the third aspect, by implementing the sheet feeding source designating method by the image forming apparatus according to the first aspect, similarly to the first aspect, it is possible to prevent the user from failing to carry out proper settings and hence avoid printing using an undesired sheet cassette, and also, the user can change the sheet feeding manner to another type of sheet feeding than manual feeding immediately if he or she desires to do so.

To attain the first object, in a fourth aspect of the present invention, there is provided a computer-readable storage medium storing a program for executing a method of controlling designation of a sheet feeding source applied to an image forming apparatus having manual sheet feeding means for manually feeding sheets, for forming images on the sheets based on an image input operation, the method comprising a first sheet designating step of designating a size of at least one sheet as a device, a second sheet designating step of designating a size of at least one sheet as a job, a sheet storing step of storing the at least one sheet having the size designated by the device or the job, and a control step of determining whether or not the manual sheet feeding means can be designated as a sheet feeding source if the size is designated by the device or the job, designating the manual sheet feeding means as the sheet feeding source when it is so determined, and displaying a sheet selecting screen for allowing a user to confirm or change the designation of the manual sheet feeding means as the sheet feeding source upon completion of the designation, if the size is designated by the device or the job.

According to the storage medium of the fourth aspect, by reading the program for executing the sheet feeding source designating method from the storage medium and executing the same, similarly to the first aspect, it is possible to prevent the user from failing to carry out proper settings and hence avoid printing using an undesired sheet cassette, and also, the user can change the sheet feeding manner to another type of sheet feeding than manual feeding immediately if he or she desires to do so.

To attain the second object, in a fifth aspect of the present invention, there is provided an image forming apparatus for forming images on sheets based on an image input operation, comprising manual sheet feeding means for manually feeding sheets, reservation accepting means for accepting at least one reservation for at least one image forming job to be activated subsequently, during image formation, sheet designating means for designating at least one sheet for manual feeding via the manual sheet feeding means based on the at least one reservation accepted by the reservation accepting means, sheet storing means for storing the at least one sheet designated by the sheet designating means for use in each of the reserved at least one image forming job, sheet determining means for determining a type of the at least one sheet designated by the sheet designating means during execution of each of the reserved at least one image forming job, and control means for controlling the image forming apparatus to form and output images in a manner according to the type of the at least one sheet based on the determination made by the sheet determining means.

In a preferred form of the fifth aspect, the image forming apparatus comprises image input means for inputting image data, image storing means for sequentially storing the image data input by the image input means, image output means for reading the image data stored in the image storing means to sequentially form images on sheets and output same, and setting means for setting a processing mode for processing the image data stored in the image storing means, and wherein the control means causes the image storing means to sequentially store the image data input by the image input means, and causes the image output means to sequentially form and output the images.

Preferably, the image forming apparatus according to the fifth aspect comprises sheet feeding means for mechanically feeding sheets, and wherein the control means causes the image output means to form and output images based on the designated at least one sheet even during image formation using the sheets fed by the sheet feeding means.

Also preferably, the image forming apparatus according to the fifth aspect comprises display means for displaying at least one of a sheet size and a sheet type, and wherein the control means causes the display means to display the at least one of the sheet size and the sheet type for a manual sheet feeding job to be activated using the manual sheet feeding means, and causes the display means to display the at least one of the sheet size and the sheet type of at least one sheet set on the manual sheet feeding means.

Typically, the processing mode comprises a mode for implementing at least one function performed by the image forming apparatus, the sheet size includes regular A sizes including A3 and A4, regular B sizes including B4 and B5, and inch-based sizes, and the sheet type includes plain sheet, thick sheet, and OHP sheet.

The image forming apparatus according to the fifth aspect is applicable to a copying machine having a copying function of reading images from originals to form images on sheets, comprising image reading means for reading images from originals, and interface means for performing data communication with external apparatuses.

The image forming apparatus according to the fifth aspect is also applicable to a printing apparatus including a printer, having a printing function of forming images on sheets, comprising interface means for performing data communication with external apparatuses.

The image forming apparatus according to the fifth aspect is further applicable to a complex copying machine having a copying function, a printing function, and a facsimile function, comprising image reading means for reading images from originals, facsimile communication means for performing data communication via a telephone line, and interface means for performing data communication with external apparatuses.

According to the image forming apparatus of the fifth aspect, when a sheet or sheets are being fed or to be fed from the manual feed tray during printing or for a reserved print job, or when the manual feed tray is being used by the preceding print job, the user can designate a sheet or sheets to be set on the manual feed tray for a print job or print jobs to be reserved. Therefore, the image forming apparatus can smoothly process printing through manual feeding in different manners according to a plurality of jobs, whereby the printing can be performed efficiently, whereby the printing can be performed efficiently.

To attain the second object, in a sixth aspect of the present invention, there is provided an image forming system which comprises an image forming apparatus having manual sheet feeding means for manually feeding sheets, for forming images on sheets based on an image input operation, and an external apparatus capable of data communication with the image forming apparatus, wherein the image forming apparatus comprises manual sheet feeding means for manually feeding sheets, reservation accepting means for accepting at least one reservation for at least one image forming job to be activated subsequently, during image formation, sheet designating means for designating at least one sheet for manual feeding via the manual sheet feeding means based on the at least one reservation accepted by the reservation accepting means, sheet storing means for storing the at least one sheet designated by the sheet designating means for use in each of the reserved at least one image forming job, sheet determining means for determining a type of the at least one sheet designated by the sheet designating means during execution of each of the reserved at least one image forming job, and control means for controlling the image forming apparatus to form and output images in a manner according to the type of the at least one sheet based on the determination made by the sheet determining means, and wherein the external apparatus has a function of transmitting code data representing images to the image forming apparatus.

According to the image forming system of the sixth aspect, the image forming system comprises the image forming apparatus having a function of reserving print jobs and the external apparatus, and therefore, similarly to the fifth aspect, it is possible to smoothly process printing through manual feeding in different manners according to a plurality of jobs, whereby the printing can be performed efficiently.

To attain the second object, in a seventh aspect of the present invention, there is provided a method of controlling image formation applied to an image forming apparatus having manual sheet feeding means for manually feeding sheets, for forming images on sheets based on an image input operation, the method comprising a reservation accepting step of accepting at least one reservation for at least one image forming job to be activated subsequently, during image formation, a sheet designating step of designating at least one sheet for manual feeding via the manual sheet feeding means based on the at least one reservation accepted by the reservation accepting step, a sheet storing step of storing the at least one sheet designated by the sheet designating step for use in each of the reserved at least one image forming job, a sheet determining step of determining a type of the at least one sheet designated by the sheet designating step during execution of each of the reserved at least one image forming job, and a control step of controlling the image forming apparatus to form and output images in a manner according to the type of the at least one sheet based on the determination made by the sheet determining step.

According to the image formation control method of the seventh aspect, by implementing the image formation control method by the image forming apparatus according to the fifth aspect, similarly to the fifth aspect, it is possible to smoothly process printing through manual feeding in different manners according to a plurality of jobs, whereby the printing can be performed efficiently.

To attain the second object, in an eighth aspect of the present invention, there is provided a computer-readable storage medium storing a program for executing a method of controlling image formation applied to an image forming apparatus having manual sheet feeding means for manually feeding sheets, for forming images on sheets based on an image input operation, the method comprising a reservation accepting step of accepting at least one reservation for at least one image forming job to be activated subsequently, during image formation, a sheet designating step of designating at least one sheet for manual feeding via the manual sheet feeding means based on the at least one reservation accepted by the reservation accepting step, a sheet storing step of storing the at least one sheet designated by the sheet designating step for use in each of the reserved at least one image forming job, a sheet determining step of determining a type of the at least one sheet designated by the sheet designating step during execution of each of the reserved at least one image forming job, and a control step of controlling the image forming apparatus to form and output images in a manner according to the type of the at least one sheet based on the determination made by the sheet determining step.

According to the storage medium of the eighth aspect, by reading the program for executing the image formation control method from the storage medium and executing the same, similarly to the fifth aspect, it is possible to smoothly process printing through manual feeding in different manners according to a plurality of jobs, whereby the printing can be performed efficiently.

The above and other objects of the invention will become apparent from the following detailed description taken in conjunction with the accompanying drawings.

DETAILED DESCRIPTION OF THE PREFERRED EMBODIMENTS

The present invention will now be described with reference to the drawings showing embodiments thereof.

First, a description will be given of a first embodiment. The first embodiment is characterized in that if a user sets a sheet size by means of a device or a job, it is determined whether or not a manual feed tray can be designated as a sheet feeding source, and when it is so determined, the manual feed tray is designated as the sheet feeding source, and further, if the user sets a sheet size by means of a device or a job, a sheet selecting screen is displayed on a touch panel of an operating section, which allows the user to confirm/change the designation of the manual feed tray as the sheet feeding source, upon completion of the sheet size designation.

Figure 1:
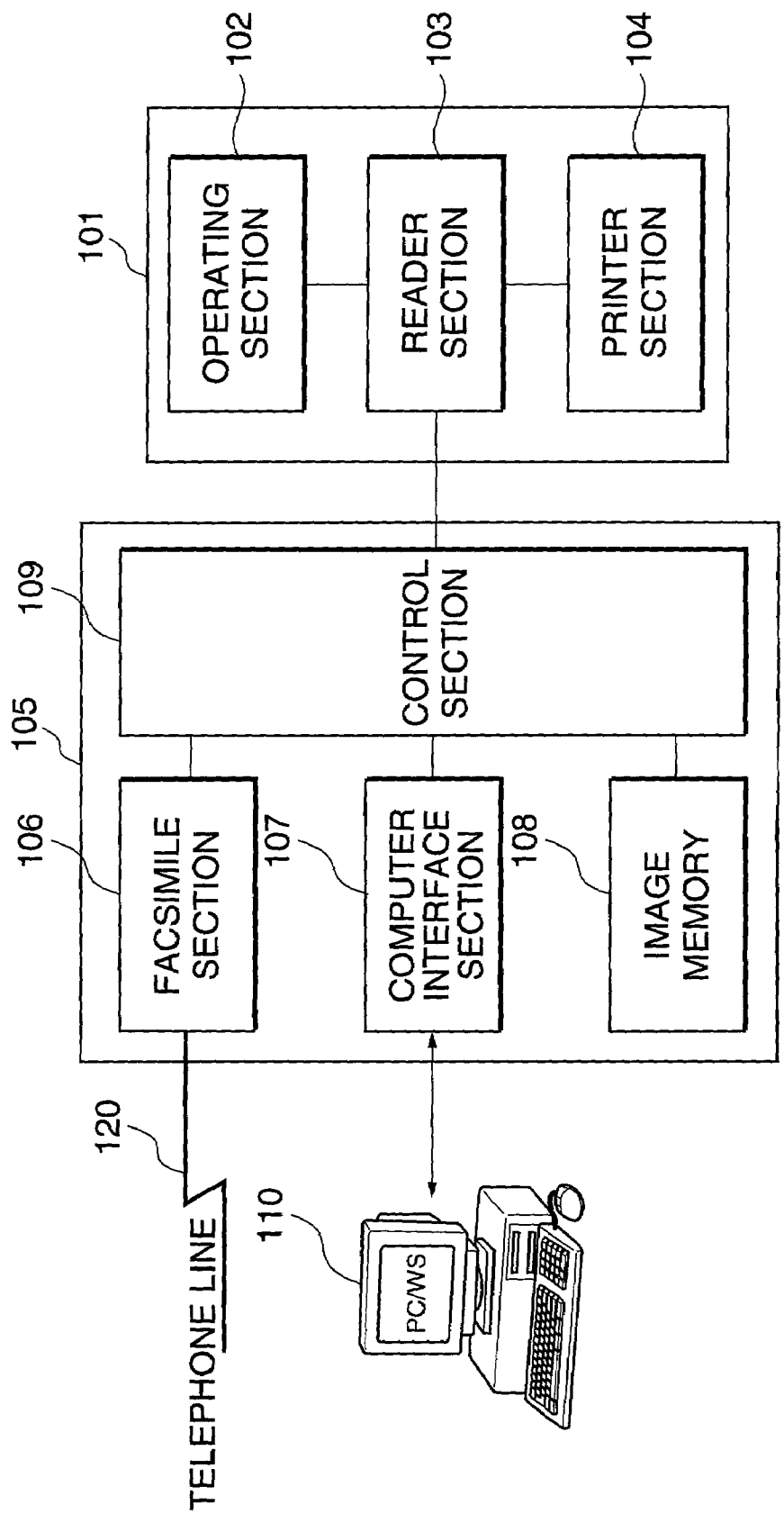
FIG. 1 is a block diagram showing the entire arrangement of a digital copying machine as an image forming apparatus according to first and second embodiments of the present invention.

FIG. 1 is a block diagram showing the arrangement of a digital copying machine (image forming apparatus) according to the first embodiment. The digital copying machine according to the first embodiment is comprised of a digital copying machine main body 101 having an operating section 102, a reader section 103, and a printer section 104, and an image input/output controller section 105 having a facsimile section 106, a computer interface section 107, an image memory 108, and a control section 109. The control section 109 of the image input/output controller section 105 is connected to the reader section 103 of the main body 101. In FIG. 1, reference numeral 110 designates a personal computer or a work station (hereinafter referred to as PC/WS), and reference numeral 120 designates a telephone line. While the digital copying machine is taken as an example of the image forming apparatus, digital copying machines are not the sole application of the invention.

The above configuration will now be described in detail. In the digital copying machine main body 101, the operating section 102 is used to operate the digital copying machine main body 101 and the image input/output controller section 105, and is provided with various keys, a touch panel, and others, as described hereinafter. The reader section 103 reads the image of an original set on the digital copying machine and sends image data corresponding to the image of the original to the printer section 104 and the image input/output controller section 105. The reader section 103 has a construction shown in FIG. 2, described hereinafter. The printer section 104 records (prints) the image corresponding to the image data from the reader section 103 and the image input/output controller section 105, and has a construction shown in FIG. 2, described hereinafter.

In the image input/output controller section 105, the facsimile section 106 expands compressed image data received via the telephone line 120, transfers the expanded image data to the control section 109, and further compresses image data transferred from the control section 109 and transmits the compressed image data via the telephone line 120. The compressed image data received by the facsimile section 106 can be temporarily stored in the image memory (hard disk) 108. The computer interface section 107 interfaces the PC/WS 110 with the control section 109, and expands code data PDL (Page Description Language) representing an image transferred from the PC/WS 110 into image data that can be recorded by the printer section 104, and delivers the expanded data to the control section 109. The image memory 108, which is formed of a hard disk or the like, stores the image data.

The control section 109 controls the flow of data between the reader section 103, facsimile section 106, computer interface section 107, and image memory 108, and supervises various kinds of display control, described hereinafter, over the touch panel (see FIG. 3) of the operating section 102 based on programs of the invention. Further, the control section 109 controls the image memory 108 to sequentially store input image data, and the printer section 104 to sequentially print out hard copies of the image. The section 109 also controls a process of determining whether or not a manual feed tray 222 can be selected as the sheet feeding source if the user designates a sheet size by means of a device or a job, and selecting the manual feed tray 222 as the sheet feeding source if it is so determined, and a process of displaying a sheet selecting screen on the touch panel 316 of the operating section 102. if the user designates a sheet size by means of a device or a job, to allow the user to confirm/change the selection of the manual feed tray 222 as the sheet feeding source, upon completion of the sheet size designation. Further, the control section 109 executes processes shown by flowcharts in FIGS. 13 and 14.

The PC/WS 110 data-communicates with the computer interface section 107 provided on the image input/output controller section 105 of the digital copying machine, and transfers the above-mentioned image-representing code data (PDL) to the control section 109 via the computer interface section 107 of the digital copying machine.

Figure 2:
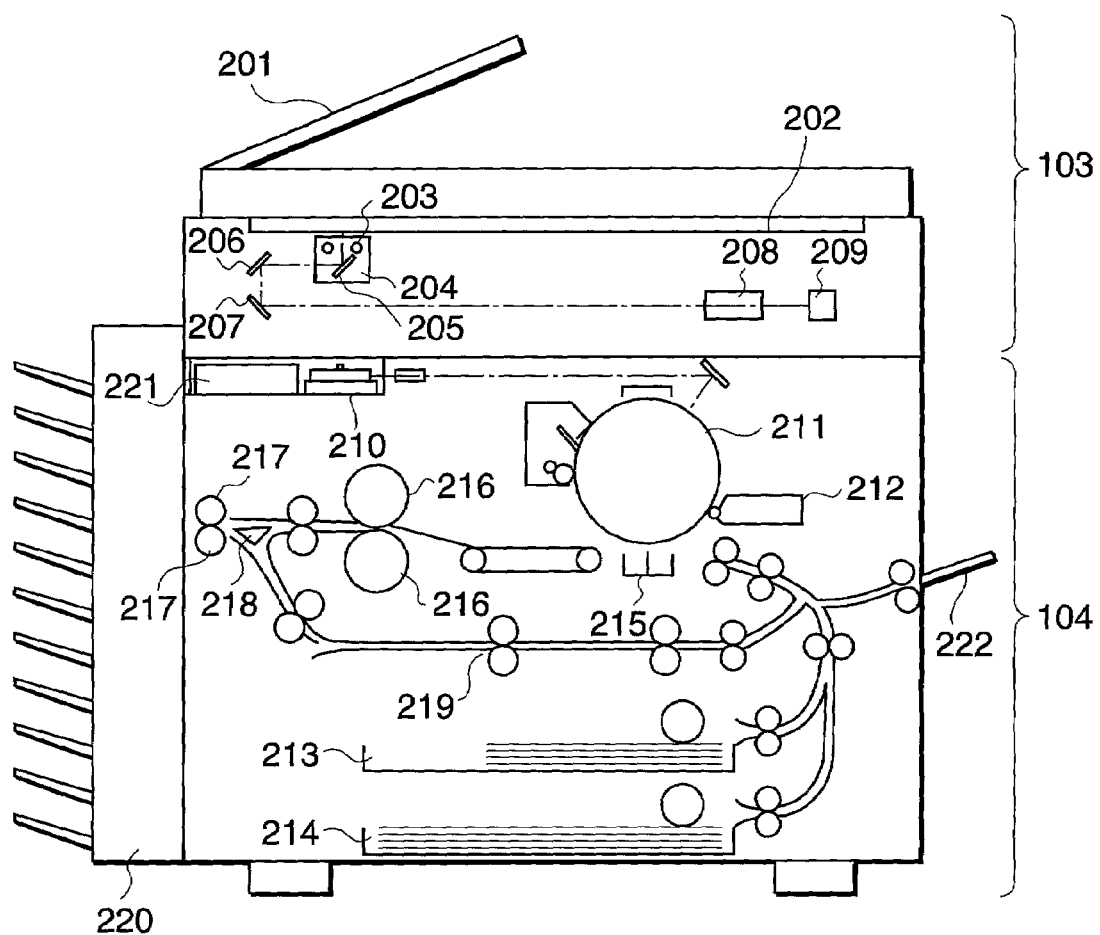
FIG. 2 is a view showing the internal structure of a reader section and a printer section of the digital copying machine according to the first and second embodiments.

FIG. 2 is a view showing the internal structure of the reader section 103 and the printer section 104 of the digital copying machine according to the first embodiment. The reader section 103 of the digital copying machine according to the first embodiment is comprised of an original feeder (RDF) 201, a platen glass (original table glass) 202, a lamp 203, a scanner unit 204, mirrors 205, 206 and 207, a lens 208, and a CCD image sensor (hereinafter referred to as the "CCD") 209. The printer section 104 is comprised of a laser beam projector section 210, a photosensitive drum 211, a developing unit 212, cassettes 213 and 214, a transfer section 215, a fixing section 216, discharge rollers 217, a flapper 218, a re-feeding path 219, a sorter 220, a laser driver 221, and a manual feed tray 222. While FIG. 2 shows only two cassettes for the sake of convenience, five cassettes are provided, for example, in the first and second embodiments of the present invention as described hereinafter. Further, the number of cassettes is not limited to five.

The above construction will be described in detail together with the operation thereof. In the reader section 103, the original feeder 201 feeds originals onto the platen glass 202 one by one from last to first. After having read all the originals, the feeder 201 discharges them from the platen glass 202. Upon feeding the originals onto the platen glass 202, the lamp 203 is turned on, and then the scanner unit 204 is activated to scan the originals by projecting a beam of light over them. The light reflected from each original is guided to the CCD 209 by the mirrors 205, 206, 207 and the lens 208. The image of each original scanned as described above is read by the CCD 209. The image data from the CCD 209 is then subjected to a predetermined process, and the processed data is further stored in storage means such as the hard disk for subsequent transfer to the printer section 104 and the control section 109 of the image input/output controller section 105.

In the printer section 104, the laser driver 221 drives the laser beam projector section 210 to project a laser beam corresponding to the image data from the reader section 103. The laser beam is irradiated on the photosensitive drum 211 to form, on the drum 211, a latent image corresponding to the laser beam. The developing unit 212 deposits a developer on the latent image portion of the photosensitive drum 211. Then, in timing synchronous with the start of projecting the laser beam, a recording sheet is fed to the transfer section 215 from either the cassette 213 or 214 to transfer the developer deposited on the photosensitive drum 211 onto the recording sheet. The recording sheet having the developer transferred thereon is then fed to the fixing section 216, where the developer is fixed to the recording sheet by heat and pressure from the section 216. The recorded sheet having passed through the fixing section 216 is then discharged by the discharge rollers 217. The sorter 220 sorts the discharged recorded sheets into bins thereof, and staples them if so required. The manual feed tray 222 is used to manually feed sheets.

When a sorting mode is not set, the sorter 220 stacks recorded sheets on its uppermost bin. When a double-sided recording mode is set, a recording sheet having data recorded on one side thereof is fed to a location where the discharge rollers 217 are arranged, and then the discharge rollers 217 are reversely rotated to cause the flapper 218 to guide the sheet to the re-feeding path 219. When a multiple recording mode is set, a recording sheet is guided to the re-feeding path 219 by the flapper 218 so as not to be fed to the discharge rollers 217. The recording sheet guided to the re-feeding path 219 is then fed to the transfer section 215 in the above-mentioned timing. Even during printing, the reader section 103 can accept a request for the next reading operation immediately when it has finished the previous reading operation. The data from the reader section 103 is stored in the storage means, such as the hard disk.

Figure 3:
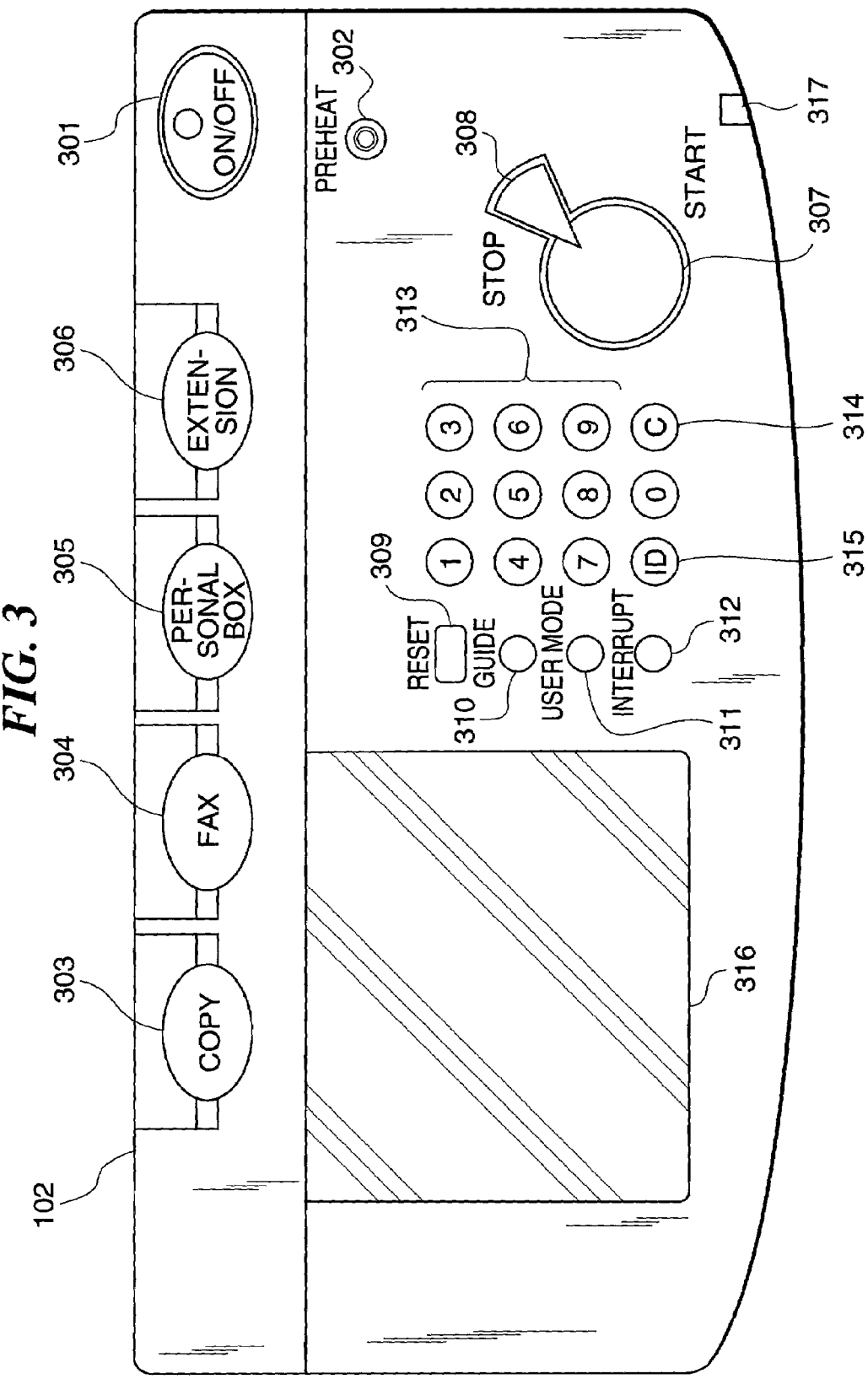
FIG. 3 is a view showing the arrangement of keys and touch panel of an operating section of the digital copying machine according to the first and second embodiments.

FIG. 3 is a front view showing the arrangement of keys and touch panel of the operating section 102 of the digital copying machine according to the first embodiment. The operating section 102 of the digital copying machine according to the first embodiment is comprised of a power switch 301, a preheat key 302, a copy mode key 303, a fax mode key 304, a personal box key 305, an extension key 306, a copy start key 307, a stop key 308, a reset key 309, a guide key 310, a user mode key 311, an interrupt key 312, numerical keys 313, a clear key 314, an ID key 315, the touch panel (liquid crystal display operating section) 316, and a tally lamp 317.

The keys arranged as above will be described in detail. The power switch 301 is operated to control supply of power to the digital copying machine. The preheat key 302 is used to turn a preheating mode on and off. The copy mode key 303 is used to select a copying mode from a plurality of functions provided by the digital copying machine. The fax mode key 304 is used to select a fax mode from the plurality of functions provided by the digital copying machine. The personal box key 305 is used to select a personal box mode from the plurality of functions provided by the digital copying machine. The personal box function provides each user or division/section of a company with a dedicated storage area of the memory that is incorporated in the copying machine in order to allow its owner to store PDL and scanned images for their output whenever the owner likes.

The extension key 306 is used to process PDL. The copy start key 307 is used to instruct the start of copying. Further, the operating section 102 is also provided with a fingerprint detecting sensor, which is arranged at an appropriate location to detect copying fingerprint data when the start of copying is instructed. The stop key 308 is used to interrupt or stop copying. The reset key 309 works as a key to put the machine back to a basic mode during stand-by. The guide key 310 is used when the user wishes to know about various functions. The user mode key 311 is used to change basic settings of the system. The interrupt key 312 is used to interrupt the current copying operation in order to start another copying operation.

The numerical keys 313 are used to enter numerical values. The clear key 314 is used to clear the entered values. The ID key 315 is used to switch to an ID inputting mode when the user uses the copying machine. The touch panel (liquid crystal display operating section) 316, formed of a combination of a liquid crystal screen and touch sensors, displays a screen for each mode to allow the user to carry out various kinds of detailed settings by touching keys depicted on the screen. The tally lamp 317 indicates the communication status of a network. The tally lamp 317 is normally green and blinks in green during communication and turns red when a network error occurs.

Figure 4:
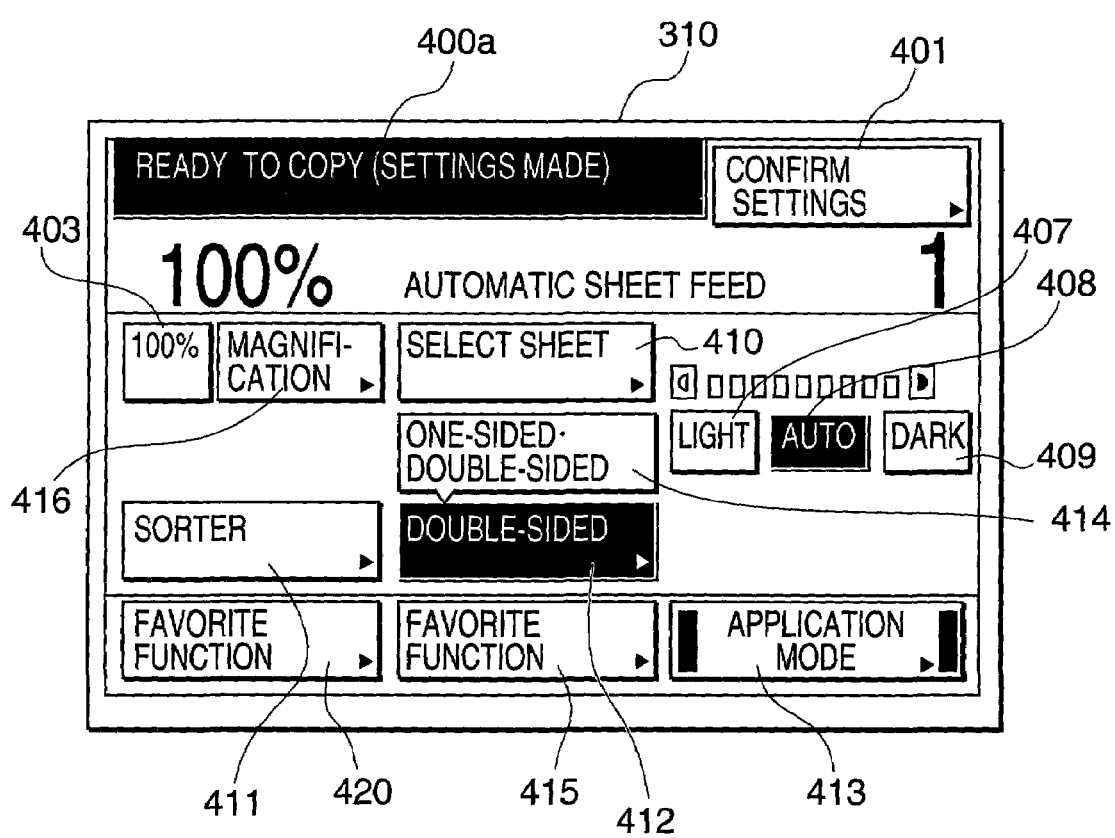
FIG. 4 is a view showing a copy basic screen displayed on a touch panel of the operating section of the digital copying machine according to the first and second embodiments.

FIG. 4 is a view showing a copy basic screen displayed on the touch panel (liquid crystal display operating section) 316 of the operating section 102 of the digital copying machine according to the first embodiment. In the figure, reference numeral 400a designates a basic screen (default screen), which is displayed on the touch panel 316 when the copying machine is in a basic or default state, which appears when the user turns on the power switch 301, or depresses the reset key 309 shown in FIG. 3, referred to above, to terminate a copying operation, for example. Reference numeral 401 designates a status displaying area, which displays the status of the digital copying machine, RDF (original feeder) 201 mounted on the digital copying machine, and the sorter 202 mounted on the digital copying machine, and settings, such as magnification and sheet size. A reduction key, not shown, is depressed to select a smaller regular size than the original size. Reference numeral 403 designates a 100% magnification or equimultiplication copying. An enlargement key, not shown, is depressed to select a larger regular size than the original size.

A slightly smaller copy key, not shown, is depressed to make copying at a magnification slightly smaller than the set magnification (its initial magnification is 93%, which can be changed by selecting an appropriate specification setting in an operator mode). Reference numeral 416 designates a magnification key depressed to make copying by setting a magnification. More specifically, the user can select an auto-zoom function wherein the magnification is automatically calculated from the size of an original and that of a sheet, and a zoom program function wherein the magnification is calculated by designating the length of image on an original and that of an output image. Reference numeral 407 designates a lighter key depressed to decrease the copy density. Reference numeral 408 designates an AE key depressed to automatically adjust the copy density according to the darkness of an original. Reference numeral 409 designates a darker key depressed to increase the copy density.

Reference numeral 410 designates a sheet selecting key depressed to either use an automatic sheet selecting (APS) function wherein a sheet size is automatically selected based on the original size and a set copying magnification. Reference numeral 411 designates a sorter key displayed only when the sorter 220 is mounted on the digital copying machine and depressed to select output modes (nonsort, sort, group sort, staple sort, etc.) for the sorter 220, and staple positions. Reference numeral 412 designates a double-sided copy key depressed to output read original images on both sides of a transferred sheet or to handle originals for double-sided copying. Reference numeral 413 designates an application mode key depressed to use various functions of the digital copying machine. When the application mode key 413 is depressed, an application mode screen 400b shown in FIG. 5, described hereinafter, is displayed.

Reference numeral 414 designates a double-sided copy settings displaying area, which displays types of double-sided copying when the user sets a double-sided copying mode (when the double-sided copy key 412 is highlighted). Reference numerals 420 and 415 designate favorite keys. When a favorite function 1 is set in the operator mode, the favorite key 420 is displayed, while when a favorite function 2 is set, the favorite key 415 is displayed.

Figure 5:
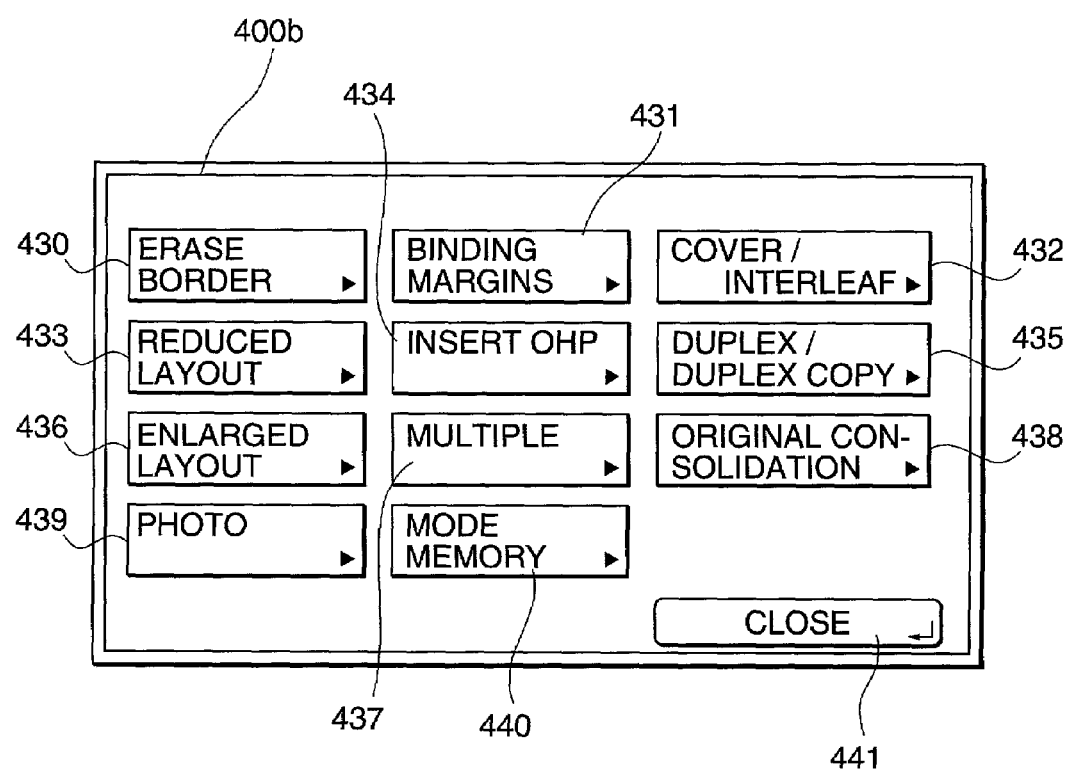
FIG. 5 is a view showing a copy application mode screen displayed on the touch panel of the operating section of the digital copying machine according to the first and second embodiments.

FIG. 5 is a view showing the copy application mode screen 400b displayed on the touch panel (liquid crystal display operating section) 316 of the digital copying machine according to the first embodiment. The application mode screen 400b is displayed when the application mode key 413 is depressed as mentioned above. Reference numeral 430 designates a border erasing key depressed to erase borders according to any of set modes, such as a sheet border erasing mode (creating a border corresponding to a sheet size), an original border erasing mode (creating a border corresponding to an original size and designating the original size), a book border erasing mode (creating a border and gutter margins corresponding to a spread size of a book and designating the spread size), a punch hole erasing mode (processing portions corresponding to punch holes in the original into white space to prevent the punch holes from turning black in the copied sheet).

Reference numeral 431 designates a binding margin key depressed to set a binding margin to any of four different margins, i.e. left, right, top, and bottom of sheet. Reference numeral 432 designates a cover sheet/interleaved sheet key depressed to insert a cover sheet, a back cover sheet, and an interleaved sheet into output sheets. Reference numeral 433 designates a reduced layout key depressed to copy a plurality of originals onto a single sheet on a reduced scale. For example, to copy four originals onto a single transfer sheet, "4 in 1" is designated, and to copy two originals onto a single transfer sheet, "2 in 1" is designated. Reference numeral 434 designates an OHP (overhead transparency feeding) insertion key depressed to designate a mode for automatically inserting an OHP sheet in copying an original thereon. This key also allows the user to select whether or not copying is made on the OHP sheet.

Reference numeral 435 designates a duplex/duplex copy key depressed to designate duplex/duplex copy wherein an original placed on the platen glass (original table glass) 202 shown in FIG. 2, referred to above, is divided into two regions, i.e. left and right, regions and each of these regions is automatically copied to a single transfer sheet (for example, this key is depressed to designate "book to open from right", "book to open from left", "upside-down sheet discharging", or the like). Reference numeral 436 is an enlarged layout key depressed to undo originals subjected to copying in the reduced layout mode. Reference numeral 437 designates a multiple key depressed to select duplex/duplex copy in a multiple mode, a duplex/duplex copy multiple mode, or the like. Reference numeral 438 designates an original consolidating key depressed to process differently sized originals placed on the RDF (original feeder) 201 shown in FIG. 2, referred to above.

Reference numeral 439 designates a photo key depressed to copy photographs. Reference numeral 440 designates a mode memory key depressed to store a user-designated copy mode having a desired combination of settings, such as the number of copies to be made, density, and magnification, or to call a stored copy mode. Reference numeral 441 designates a close key depressed to close the application mode screen 400b. When this key is depressed, the basic screen 400a shown in FIG. 4, referred to above, is displayed on the touch panel 316. It should be noted that the "binding margin" and "border erasing" functions set by the favorite keys 420 and 415 displayed on the basic screen 400a shown in FIG. 4 are the same as those set by the binding margin key 431 and the border erasing key 430 displayed on the application mode screen 400b.

Figure 6:
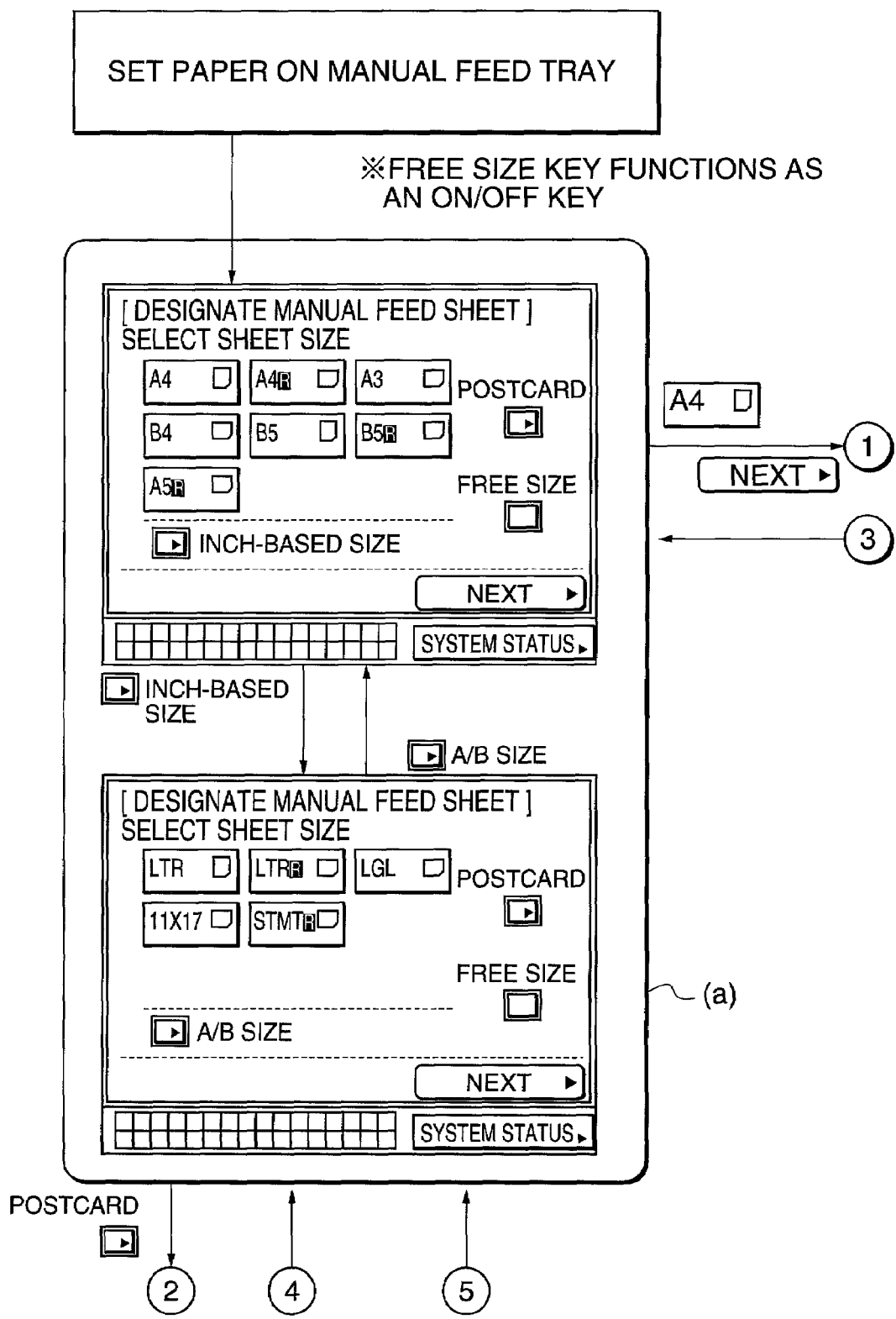
FIG. 6 is a view showing screens for carrying out sheet size/type settings displayed on the touch panel of the operating section of the digital copying machine according to the first and second embodiments, when a sheet or sheets are set on a manual feed tray.
Figure 7:
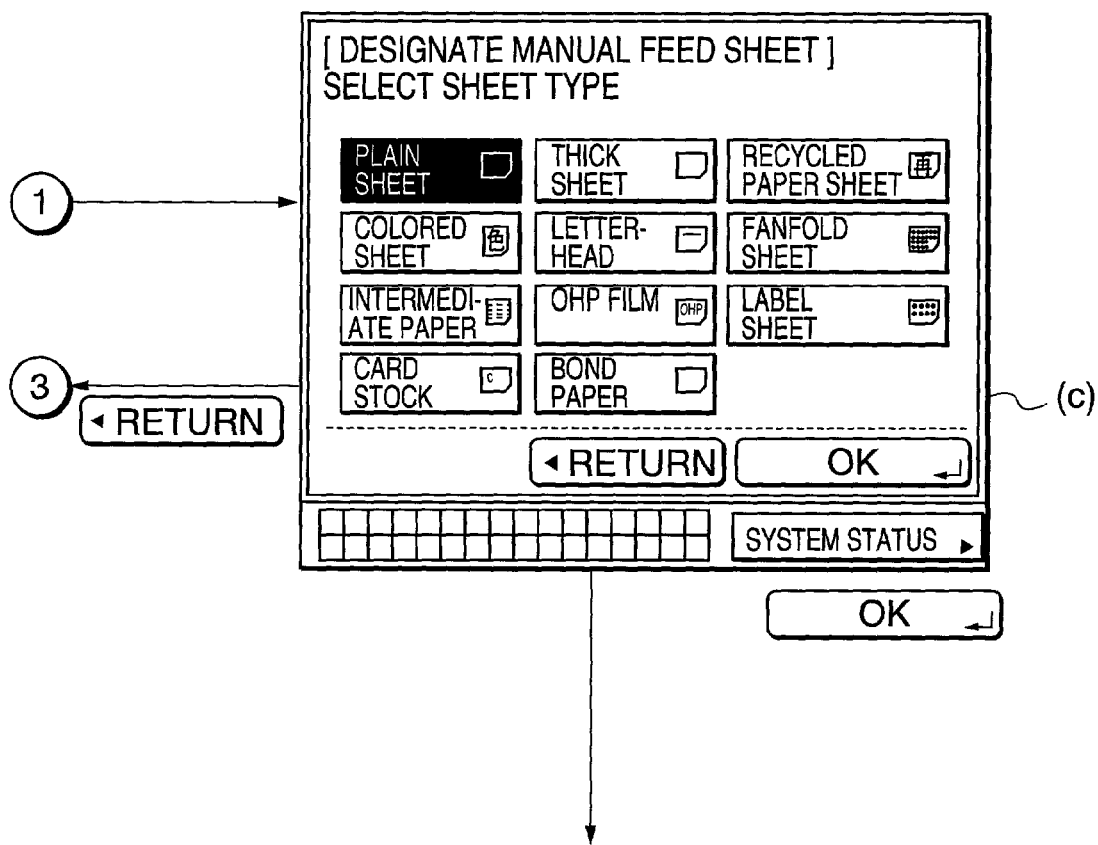
FIG. 7 is another view showing screens for carrying out sheet size/type settings displayed on the touch panel of the operating section of the digital copying machine according to the first and second embodiments, when a sheet or sheets are set on the manual feed tray.
Figure 7:
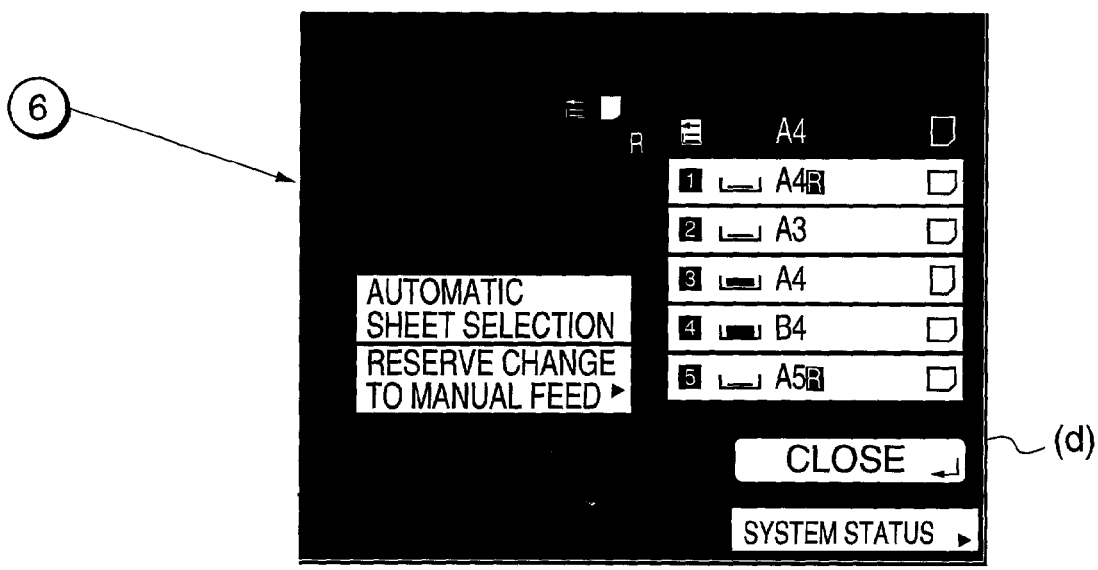
Figure 8:
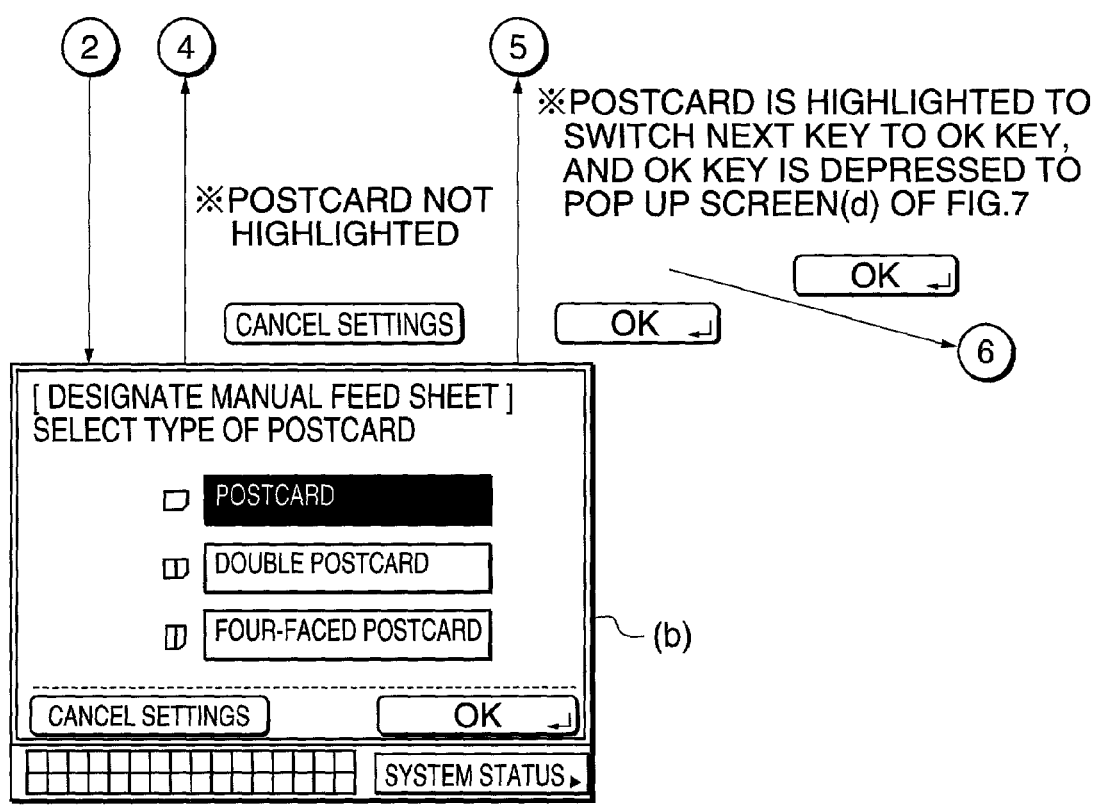
FIG. 8 is still another view showing a screen for carrying out sheet size/type settings displayed on the touch panel of the operating section of the digital copying machine according to the first and second embodiments, when a sheet or sheets are set on the manual feed tray.
Figure 13:
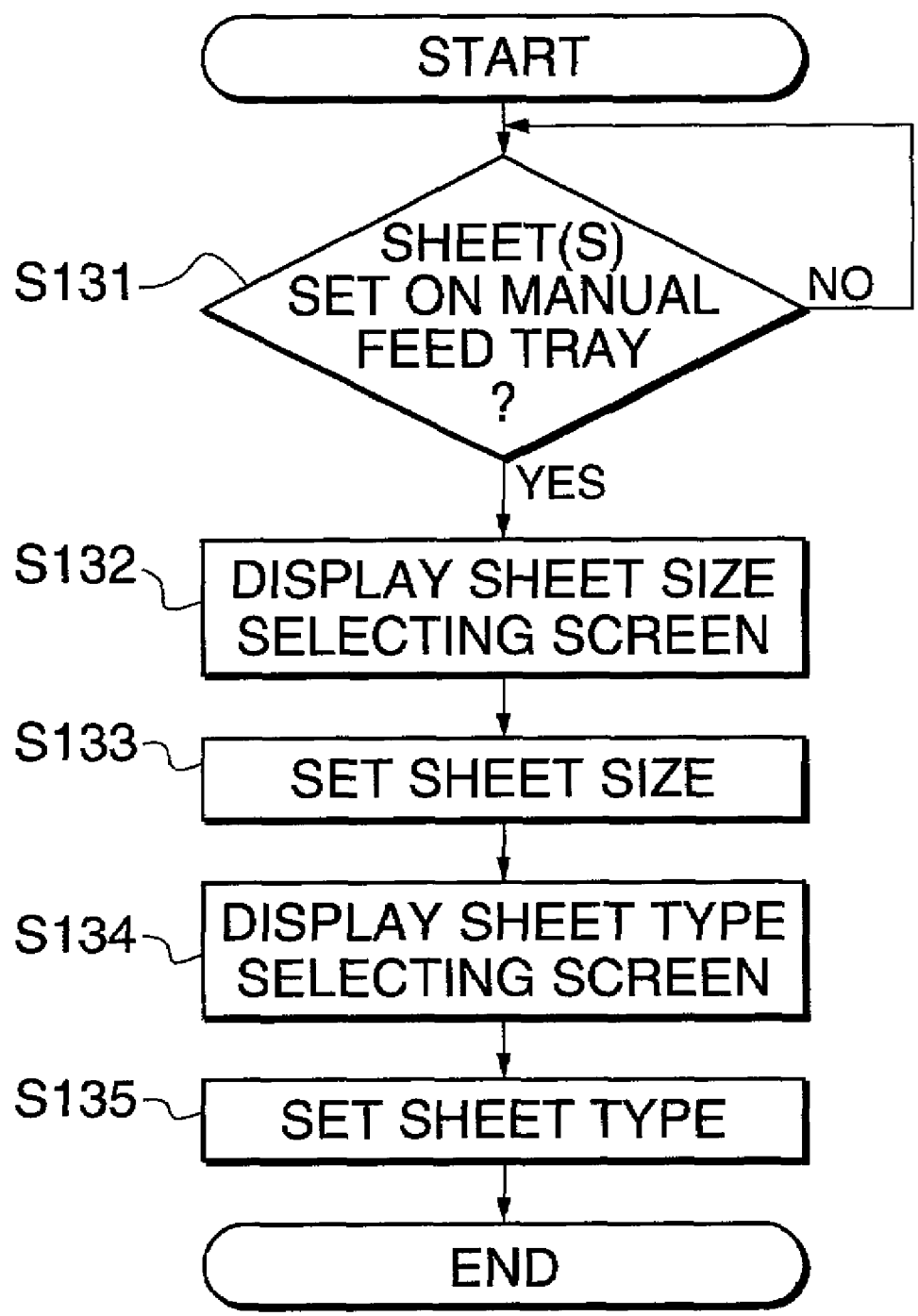
FIG. 13 is a flowchart showing a flow of a process of carrying out sheet size/type settings for the manual feed tray as a device, in the digital copying machine according to the first embodiment.

Next, a description will be given of screens displayed on the touch panel (liquid crystal display operating section) 316, shown in FIG. 3, referred to above, when the operator designates the size and type of sheets set on the manual feed tray 222 provided on the thus constructed digital copying machine according to the first embodiment, with reference to FIGS. 6 to 8 and to a flowchart shown in FIG. 13. FIGS. 6 to 8 are views showing examples of screens displayed on the touch panel 316 to designate sheet size and type for the manual feed tray as a device, and FIG. 13 is a flowchart showing a flow of a process of carrying out sheet size/type settings for the manual paper feed try as a device. The control section 109 executes the process shown in the flowchart of FIG. 13.

A screen (a) shown in FIG. 6 is displayed as a sheet size selecting screen on the touch panel 316 (step S132) when the user sets a sheet or sheets on the manual feed tray (YES at a step S131). When the user sets a sheet size through the screen (a) of FIG. 6 (step S133), a sheet type selecting screen (c) shown in FIG. 7 is displayed on the touch panel 316 (step S134). This screen (c) of FIG. 7 is displayed to prompt the user to set a sheet type (step S135).

The sheet size selecting screen is displayed on the touch panel 316 on the following conditions:

If the user sets a sheet or sheets on the manual feed tray;

If a sheet or sheets are found on the manual feed tray when the machine is turned on;

The screen is always displayed on top of a regular touch panel screens (only on the basic or default screen, sheet selecting screen, and application mode screen as far as copying is concerned);

The screen is displayed upon closing a screen that displays a dialogue box indicating that a job is being executed, during display of a dialogue box, and upon closing a user mode screen for changing basic settings of the system, a system status, a counter screen, or a status screen that displays a jamming message, a corporate division/section ID, a control card, a guidance message or the like;

The screen is displayed also when the user instructs starting a print job and sets a sheet or sheets on the manual feed tray after [Reserve Change to Manual Feed] has been made to reserve a change to manual feeding as the print job (sheet size/type settings already selected), to prompt the user to enter a sheet size again.

When the user depresses an OK button after entering the sheet size on the sheet selecting screen (a) of FIG. 6, the popped-up screen ("popping-up" is a function of displaying an instruction for an operation related to a desired item on a screen when the desired item is selected on the screen) is closed, followed by returning to a screen immediately preceding the popping-up. This operation of selecting the sheet size on the sheet size selecting screen is for setting the sheet size for the manual feed tray as a device, and therefore does not affect the sheet size for manual feeding for the print job, that is, the selected sheet size is registered only for the manual feed tray as a device. The manual feed tray is not automatically selected as a sheet cassette for use. However, if the popping-up is activated by the user's operation when the copy basic screen, copy application mode screen or sheet selecting screen is displayed (by depressing a sheet selecting button on the copy basic screen), the sheet size entered through this sheet size selecting screen is registered not only for the manual feed tray as a device but also for manual feeding for a print job. Further, in this case, the manual feed tray is automatically set as the sheet cassette for use. To allow the user to confirm the change to manual feeding, a sheet selecting screen (d) shown in FIG. 7 is displayed on the touch panel 316 upon completion of the sheet size designation. Thus, the user can check that manual feeding is selected, and can also select a different sheet feed mode immediately when he or she so wishes, on this screen.

For copying, when the sheet size selecting screen for manual feeding is closed, the sheet selecting screen is displayed with the manual feeding selected. To change the sheet feeding mode from the manual feed tray as a device for use, the user is requested to remove or set a sheet or sheets on the manual feed tray. (A [Reserve Change to Manual Feed] key is depressed when the user desires to reserve a change to manual feeding as a job from manual feeding from the manual feed tray as a device.)

Figure 14:
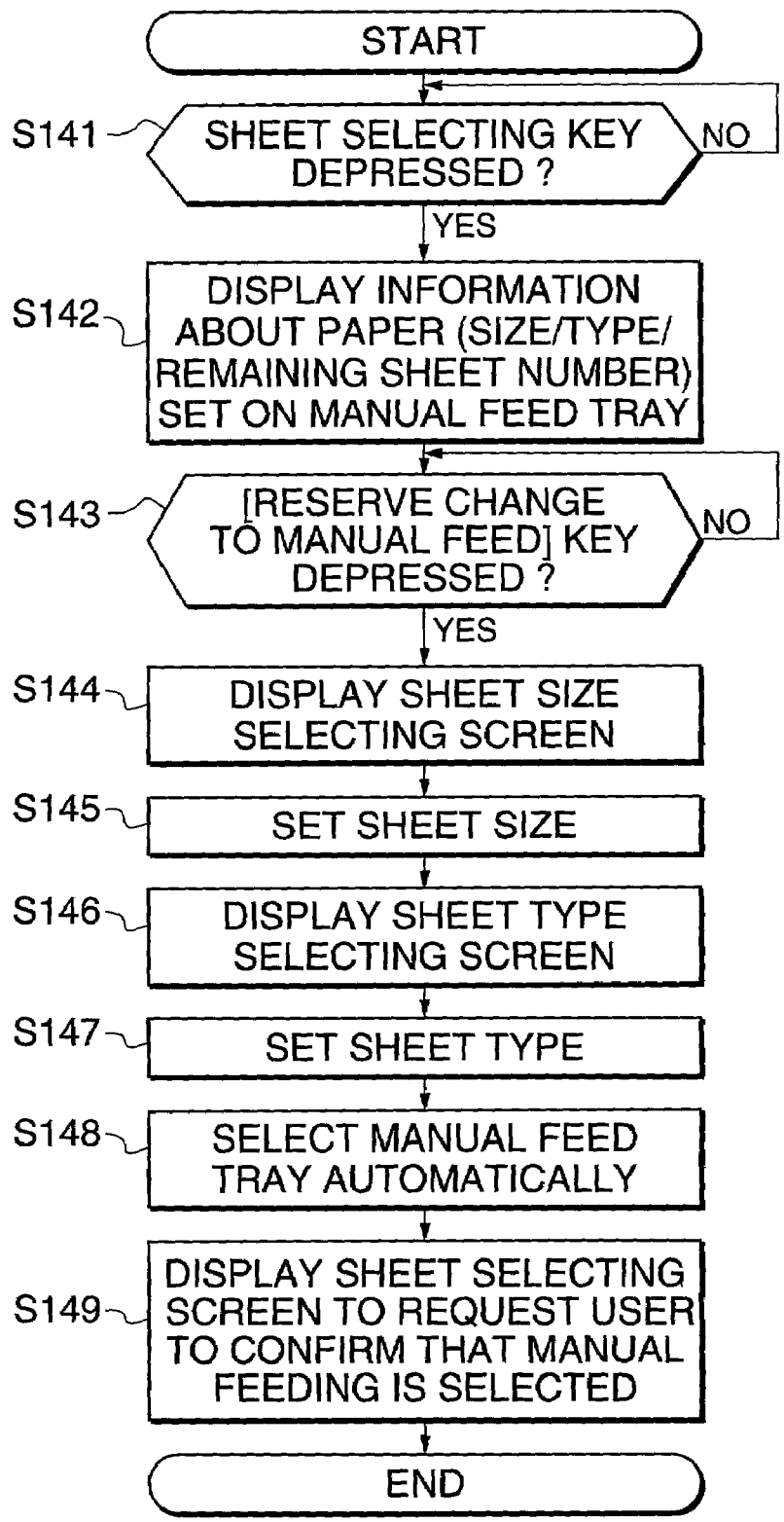
FIG. 14 is a flowchart showing a flow of a process of carrying out sheet size/type settings for manual feeding as a job, in the digital copying machine according to the first embodiment.

Next, a description will be given of screens displayed on the touch panel (liquid crystal display operating section) 316 when the operator carries out sheet size/type settings for manual feeding as a job in the digital copying machine according to the first embodiment with reference to FIGS. 9 to 12 and to a flowchart shown in FIG. 14.

FIGS. 9 to 12 are views showing examples of screens displayed on the touch panel 316 when the user carries out sheet size/type settings for manual feeding as a job. FIG. 14 is a flowchart showing a flow of a process of carrying out sheet size/type settings for manual feeding as a job. The control section 109 executes the process shown in the flowchart of FIG. 14.

Figure 9:
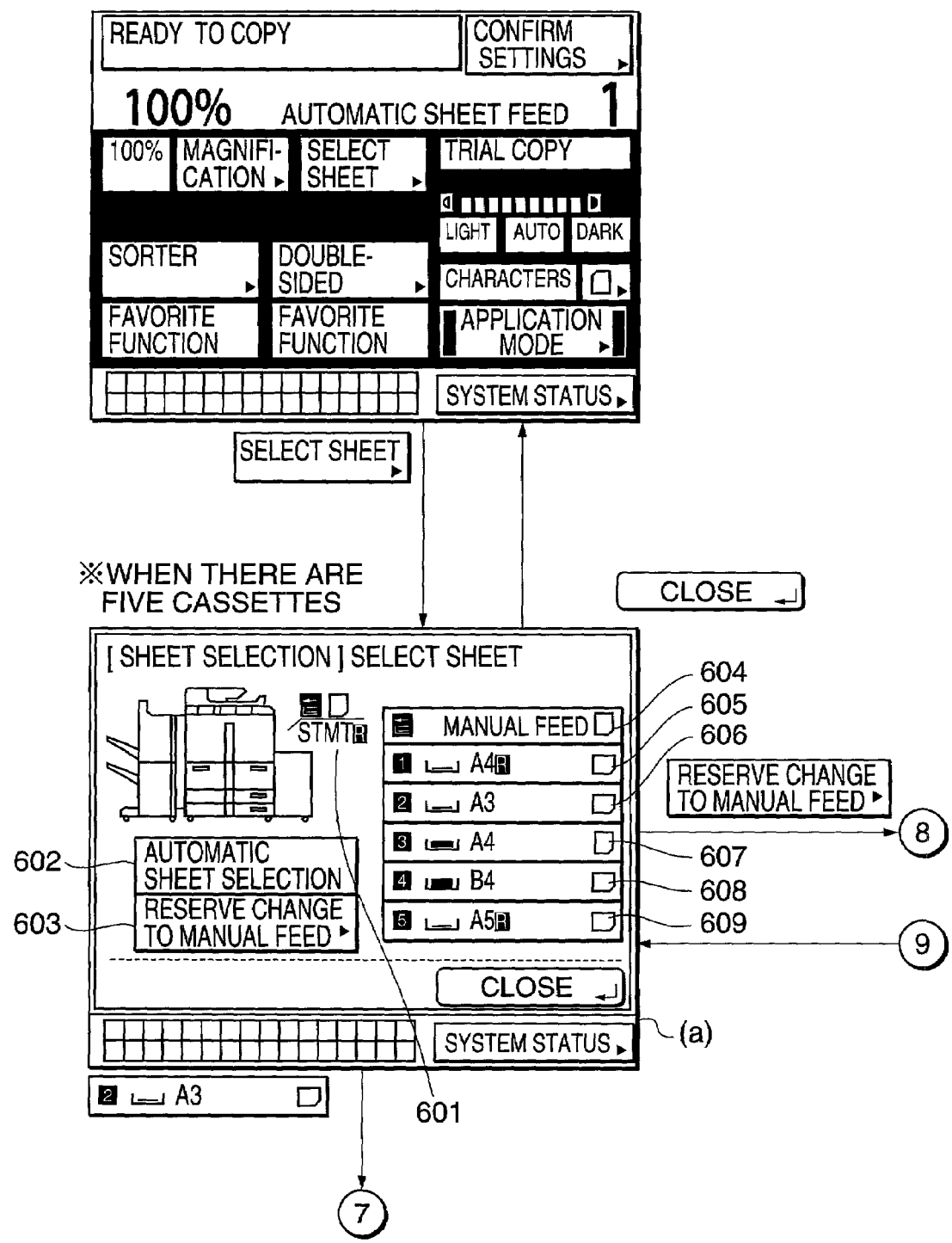
FIG. 9 is a view showing screens for carrying out sheet size/type settings for manual feeding as a job displayed on the touch panel of the operating section of the digital copying machine according to the first and second embodiments.
Figure 10:
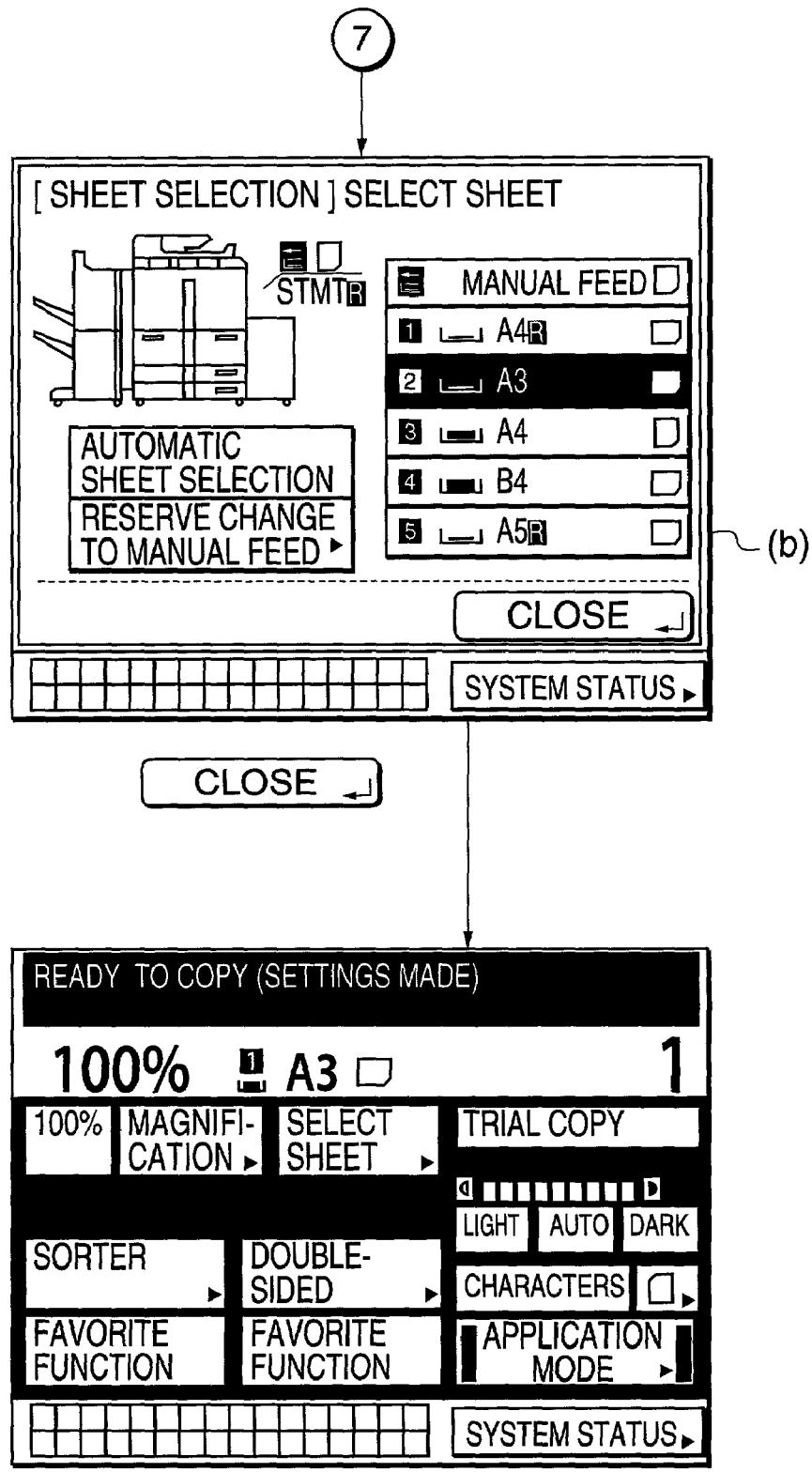
FIG. 10 is another view showing screens for carrying out sheet size/type settings for manual feeding as a job displayed on the touch panel of the operating section of the digital copying machine according to the first and second embodiments.

When a sheet selecting key 410 is depressed on the basic screen (YES at a step S141), a screen (a) shown in FIG. 9 is displayed on the touch panel 316. In the sheet selecting screen (a) of FIG. 9, an area 601 displays information about paper (size/type/remaining number of sheets) (step S142). When there is no sheet on the manual feed tray 222, a manual feeding icon and a remaining sheet number icon (displayed as empty) are displayed, together with a message "THERE IS NO SHEET" on the status line similarly to sheet cassettes. When there is a sheet or sheets on the manual feed tray, displayed are sheet size and sheet type icons (including a sheet orientation icon) designated on the [Manual Feeding Sheet Designating] screen shown in FIG. 6, referred to above, the manual feeding icon, and the remaining sheet number icon (a triple line icon when there is only one sheet available).

Reference numeral 602 designates an automatic sheet selecting key depressed to select a sheet size corresponding to the original size and magnification set during sheet selection. Reference numeral 603 designates the [Reserve Change to Manual Feed] key depressed to set sheet size and sheet type for a job to be activated. The obtained settings are retained until reset/auto clear functions are started. Reference numeral 604 designates a manual feeding selecting key depressed to select manual feeding for printing for feeding of transfer sheets from the manual feed tray.

Reference numeral 605 designates a first cassette selecting key depressed to select a first cassette for feeding of transfer sheets therefrom for printing. Reference numeral 606 designates a second cassette selecting key depressed to select a second cassette for feeding of transfer sheets therefrom for printing. Reference numeral 607 designates a third cassette selecting key depressed to select a third cassette for feeding of transfer sheets therefrom for printing. Reference numeral 608 designates a fourth cassette selecting key depressed to select a fourth cassette for feeding of transfer sheets therefrom for printing. Reference numeral 609 designates a fifth cassette selecting key depressed to select a fifth cassette for feeding of transfer sheets therefrom for printing.

Figure 11:
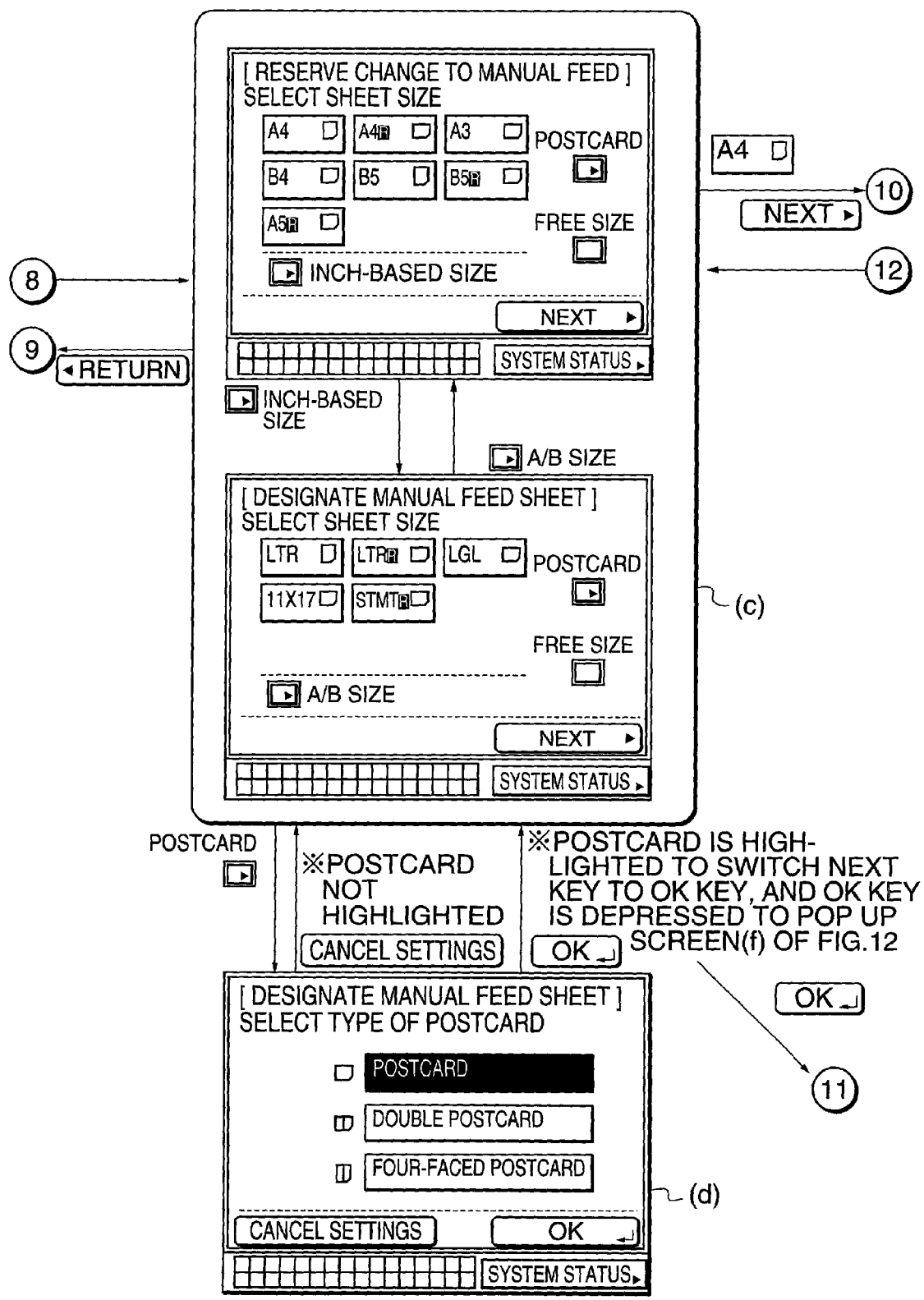
FIG. 11 is still another view showing screens for carrying out sheet size/type settings for manual feeding as a job displayed on the touch panel of the operating section of the digital copying machine according to the first and second embodiments.
Figure 12:
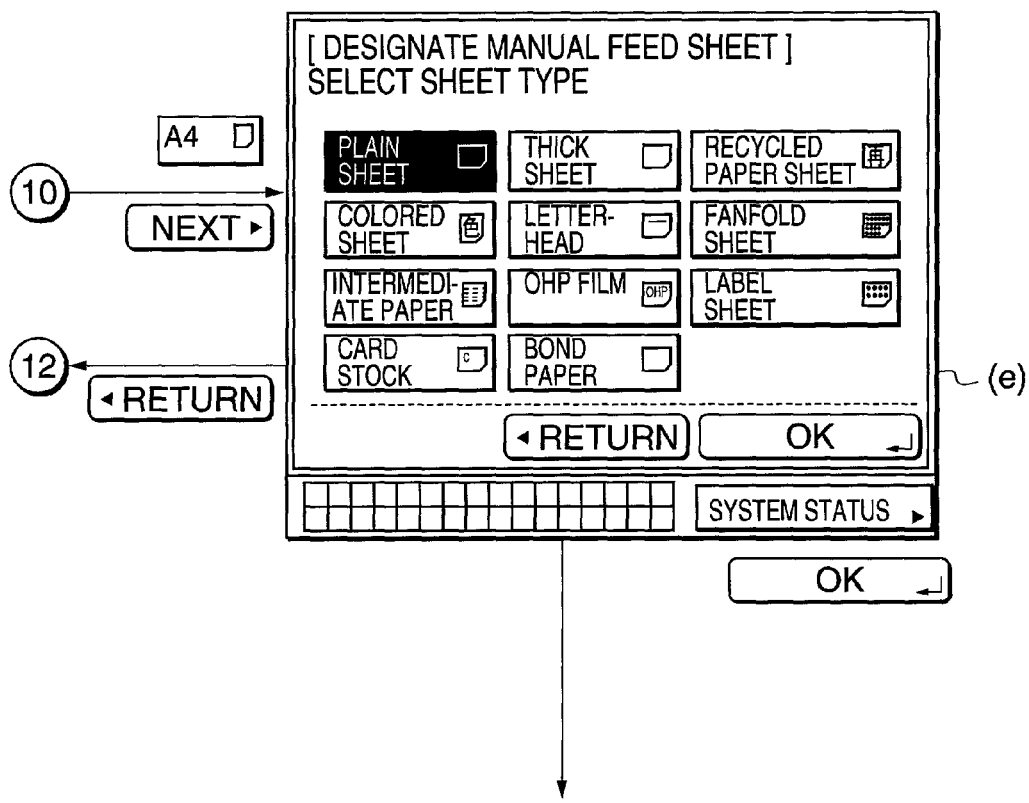
FIG. 12 is still another view showing screens for carrying out sheet size/type settings for manual feeding as a job displayed on the touch panel of the operating section of the digital copying machine according to the first and second embodiments.
Figure 12:
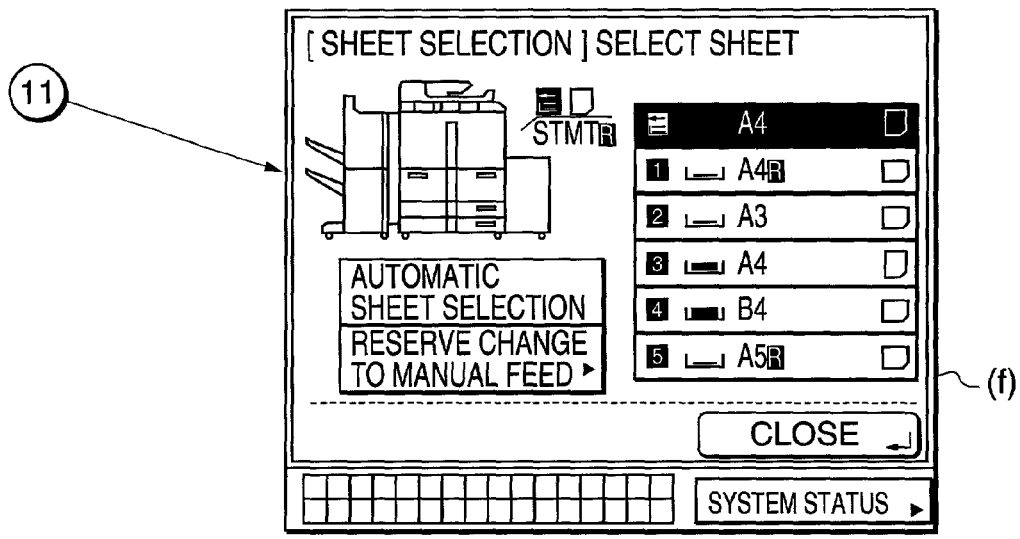

The [Reserve Change to Manual Feed] key 603 can be depressed even when no sheet is on the manual feed tray (the key is not shaded). Further, as long as a sheet or sheets are on the manual feed tray, this key 603 can be depressed even if manual feeding is not selected. When the [Reserve Change to Manual Feed] key 603 is depressed (YES at a step S143), a sheet size setting screen (c) shown in FIG. 11 is displayed on the touch panel 316 (step S144). The screen (c) of FIG. 11 is for prompting the user to set a sheet size for a job of designating manual feeding to be activated. When the user sets the sheet size (step S145), a sheet type selecting screen (e) shown in FIG. 12 is displayed (step S146). The screen (e) of FIG. 12 allows the user to select a sheet type for the job of designating manual feeding to be activated. When the sheet type is selected (step S147), a sheet selecting screen (f) shown in FIG. 12 is displayed.

Through the sheet selecting screen (f) of FIG. 12, the sheet size/type icons (including the sheet orientation icon) are reflected in the [Manual Feed] key. Upon designation of the sheet size and type, the manual feed tray is automatically selected (step S148). The [Manual Feed] key is then highlighted, while the [Reserve Change to Manual Feed] key is not highlighted. This is to allow the user to confirm that manual feeding is selected by displaying the sheet selecting screen after the user designated the sheet size and type (step S149), and to enable the user to select another sheet feeding mode immediately if he or she so wishes.

The manual feeding selecting key 604 displays a message "MANUAL FEED" when no sheet is on the manual feed tray. When a sheet or sheets are set on the tray, the sheet size/type icons (including the sheet orientation icon) designated through the [Designate Manual Feeding Paper] screen shown in FIG. 6, referred to above, are displayed, leaving the remaining sheet number icon undisplayed for the manual feed tray, because such information is not available due to the fact that the manual feed tray is provided only with a sensor for detecting the presence of sheets, not for counting the number of remaining sheets. When the [Reserve Change to Manual Feed] has been made, the designated size/type icons are displayed. Since this is the designation for a job to be activated, the user might wish to select different sheet size/type settings from those set for the sheet or sheets actually placed on the manual feed tray. The sheet size/type set for the manual paper feed tray is to be displayed on the area 601. When the manual feeding selecting key 604 is depressed, the manual feed tray is selected as the sheet feeding source for the job in question. The attributes of sheets, i.e. sheet size and sheet type set for the job in question are the same as those selected through the [Reserve Change to Manual Feed] key.

As described above, according to the digital copying machine of the first embodiment, there are provided the reader section 10, the facsimile section 106, the computer interface section 107 for inputting image data, the image memory 108 for sequentially storing the input image data, the printer section 104 for reading the stored image data from the image memory 108 to sequentially print the read image on sheets, the operating section 102 capable of displaying the copy basic screen and the copy application mode screen, and the control section 109 for controlling the image memory 108 to sequentially store the input image data, controlling the printer section 104 to sequentially print out hard copies of the stored image, and also controlling the process of determining whether or not the manual feed tray can be designated as the sheet feeding source if the user designates a sheet size by a device or a job, and selecting the manual feed tray as the sheet feeding source if it is so determined, and controlling the process of displaying the sheet selecting screen by the operating section 102, if the user designates a sheet size by a device or a job, to allow the user to confirm or change the selection of the manual feed tray as the sheet feeding source, upon completion of the sheet size designation. This configuration provides the following operations and results:

In the above configuration, when the user sets a sheet or sheets on the manual feed tray of the digital copying machine, the control section 109 displays the sheet size selecting screen on the touch panel 316 of the operating section 102. Then, the user designates a sheet size on the same screen. Responsive to the sheet size designation, the control section 109 then displays the sheet type selecting screen on the touch panel 316 of the operating section 102. The user now selects a sheet type on the same screen.

When the user depresses the sheet selecting key on the basic screen of the touch panel 316 of the operating section 102, the control section 109 displays, on the sheet selection screen, the screen related to paper (size/type/remaining sheets) set on the manual feed tray. When there is no sheet on the manual feed tray, the control section 109 displays the manual feeding icon and the remaining sheet number icon (displayed as empty), together with a message "THERE IS NO SHEET" on the touch panel 316 of the operating section 102. When there is a sheet or sheets on the manual feed tray, the operating section 109 displays the sheet size/type icons (including the paper orientation icon) designated on the manual feeding sheet designating screen, together with the manual feeding icon and remaining sheet number icon, on the touch panel 316 of the operating section 102.

The control section 109 then displays the screen allowing the user to set a sheet size for a manual feeding designating job to be activated, on the touch panel 316 of the operating section 102. When the user sets the sheet size, the control section 109 displays the screen requesting the user to select a sheet type for the same job on the touch panel 316 of the operating section 102. Once the user has designated the sheet size and type, the manual feed tray is selected automatically.

Further, the control section 109, after the user has designated the sheet size and type, displays the sheet selecting screen on the touch panel 316 of the operating section 102 to allow the user to confirm that the sheet feeding mode has been changed to manual feeding. If the user wishes to feed a sheet or sheets in any other mode than the manual feeding mode, the control section 109 displays the sheet selecting screen on the touch panel 316 of the operating section 102 so that the user can select a different sheet feeding mode immediately.

Therefore, in the first embodiment, when the user designates the sheet size for manual feeding, the copying machine, recognizing that a request has been made to execute manual feeding, automatically selects the manual feed tray as the sheet cassette, to thereby enable preventing a user from failing to carry out proper settings and hence avoid printing using an undesired sheet cassette. Further, to enable the user to check that the manual feed tray has been automatically selected, the machine displays the sheet selecting screen after the user has designated the sheet size for manual feeding, to allow the user to confirm the selection of the manual feeding mode, and if the user wishes to use a paper feeding mode other than the manual feeding mode while checking the screen, the user is allowed to select the other mode immediately on the screen.

Next, a second embodiment of the present invention will be described.

Before giving a detailed description of the second embodiment, the second embodiment will be summarized. According to the second embodiment, a reservation for the next print job is accepted during printing, a sheet or sheets for manual feeding from the manual feed tray are designated, the sheet or sheets for use per reserved print job are stored, and the type of the sheet or sheets is determined at the time of execution of each print job, and the printer section is controlled to print out hard copies in a manner according to the determined sheet type.

A digital copying machine (image forming apparatus) according to the second embodiment is constructed similarly to the digital copying machine according to the first embodiment shown in FIG. 1, that is, it is comprised of the digital copying machine main body 101 having the operating section 102, the reader section 103, and the printer section 104, and the image input/output control section 105 having the facsimile section 106, the computer interface section 107, the image memory 108, and the control section 109. The control section 109 of the section 105 is connected to the reader section 103 of the main body 101 (see FIG. 1 referred to above).

Figure 15:
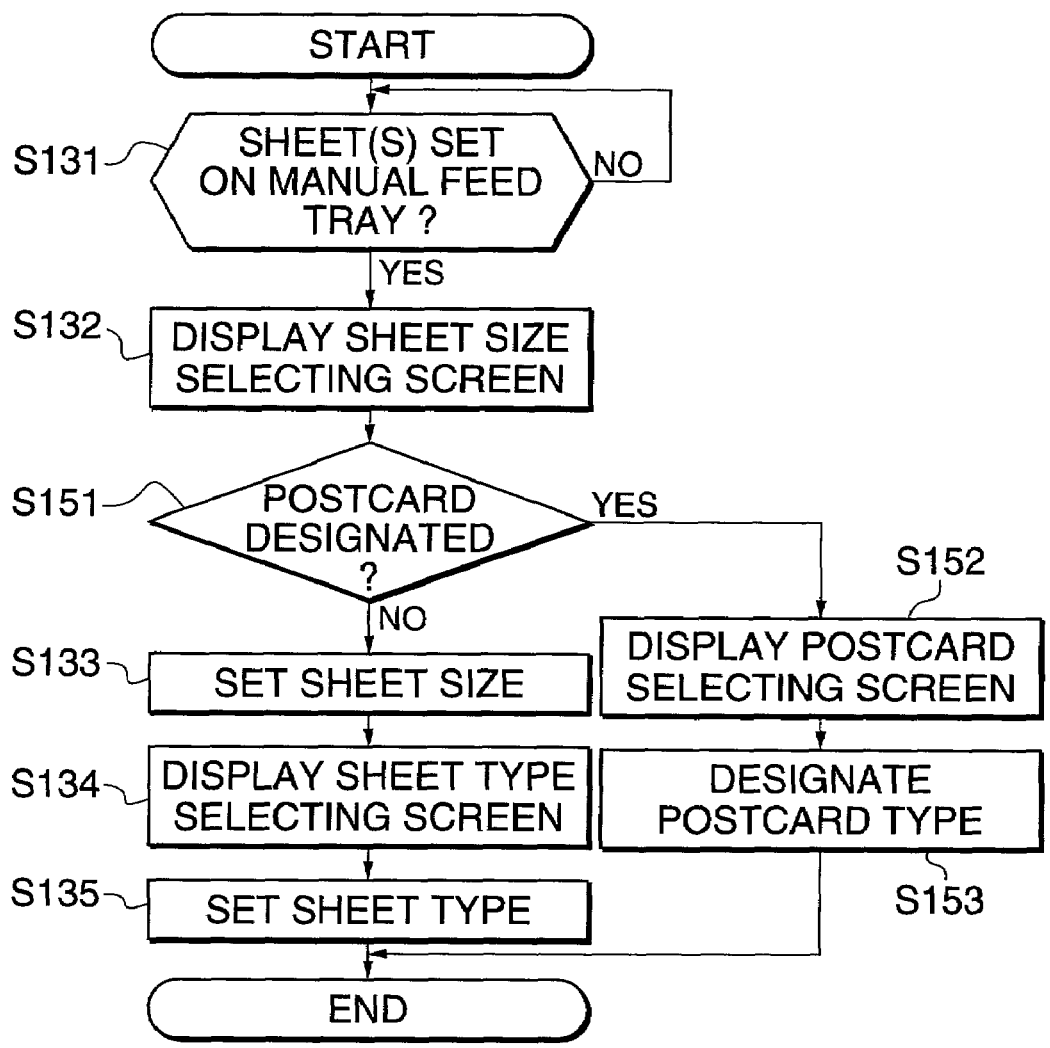
FIG. 15 is a flowchart showing a flow of a process of carrying out sheet size/type settings for the manual feed tray as a device, in the digital copying machine according to the second embodiment.
Figure 16:
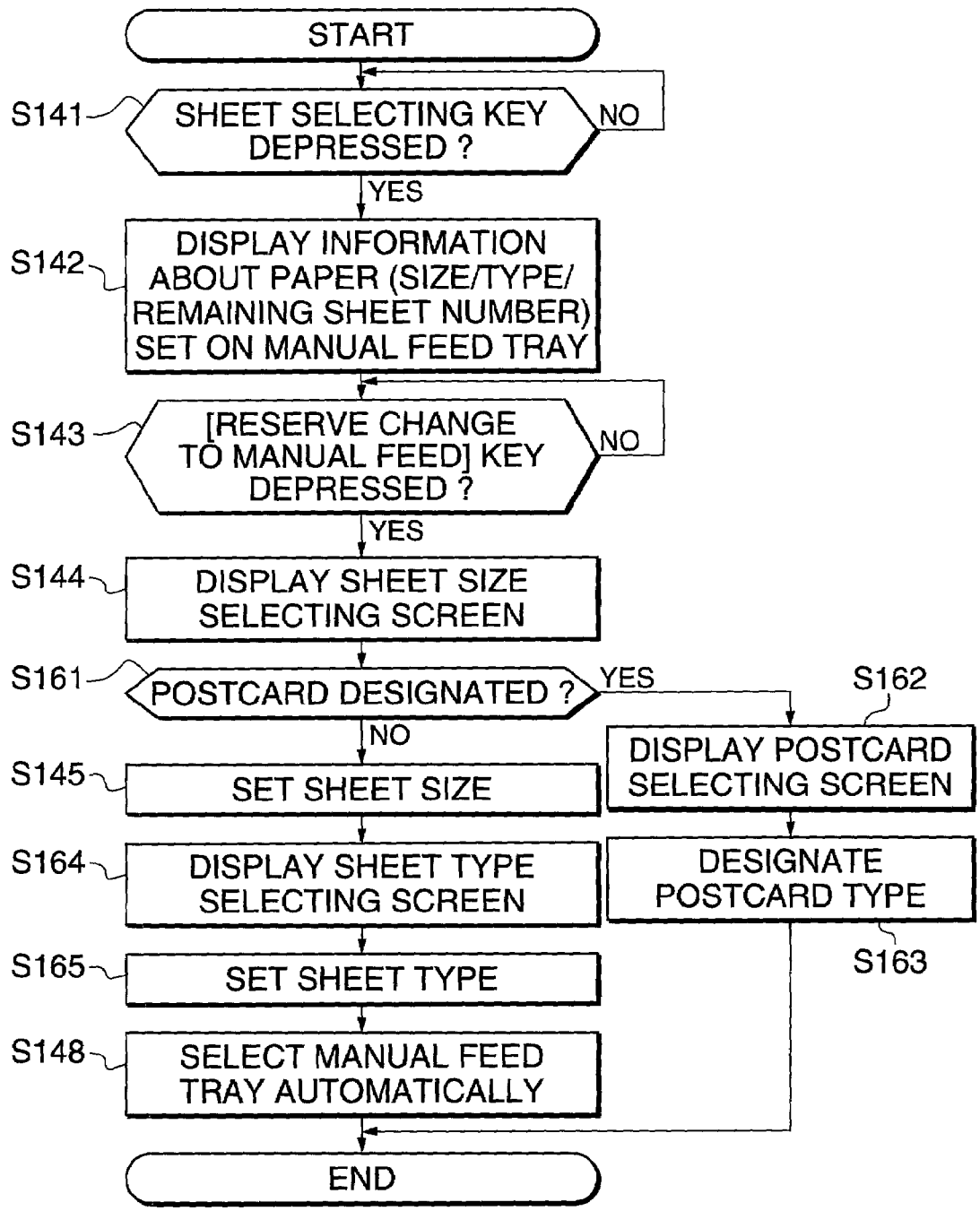
FIG. 16 is a flowchart showing a flow of a process of carrying out sheet size/type settings for manual feeding as a job, in the digital copying machine according to the second embodiment.

The second embodiment is different from the first embodiment in that the control section 109 controls a process of accepting a reservation for the next print job during printing, storing a sheet or sheets for use per reserved job based on designation of the sheet or sheets for feeding from the manual feed tray 222 per reserved print job, determining the type of the designated sheet or sheets at the time of executing each reserved print job, and controlling the printer section 104 to print out hard copies in a manner according to the determined sheet type, according to flowcharts shown in FIGS. 15 and 16. The second embodiment is otherwise identical with the first embodiment.

Further, the configuration of the reader section (see FIG. 2 described above), the configuration of the operating section (see FIG. 3 described above), various screens such as the copy basic screen and the copy application mode screen (see FIGS. 4 to 12 described above) displayed on the touch panel of the operating section of the digital copying machine according to the second embodiment are identical or similar to those of the first embodiment. Since the configurational particulars of FIGS. 1 to 5 referred to above have been described in detail with reference to the first embodiment, their description is omitted.

Next, a description will be given of the operation of the second embodiment, i.e. screens displayed on the touch panel (liquid crystal display operating section) 316 shown in FIG. 3, referred to above, when the operator designates the size and type of paper set on the manual feed tray 222 provided on the thus constructed digital copying machine according to the second embodiment, with reference to FIGS. 6 to 8 and to a flowchart shown in FIG. 15, while delineating their differences from those of the first embodiment.

FIGS. 6 to 8 are views showing examples of screens displayed on the touch panel 316 to carry out sheet size/type settings for the manual feed tray as a device, and FIG. 15 is a flowchart showing a flow of a process of carrying out sheet size/type settings for the manual feeding try as a device, which is executed by the control section 109. In FIG. 15, steps common to those in FIG. 13, referred to above, are designated by the same step numbers, and their description is simplified or omitted. The steps S131 to S135 are identical with those in the first embodiment.

The screen (a) shown in FIG. 6 is displayed on the touch panel 316 as the sheet size selecting screen when the user sets a sheet or sheets on the manual feed tray. This screen (a) of FIG. 6 allows the user to select a sheet size from regular A and B sizes (A3/A4/A5/B4/B5) or inch-based sizes.

When "POSTCARD" is depressed on the screen (a) of FIG. 6 (YES at a step S151), a postcard selecting screen (b) shown in FIG. 8 is displayed on the touch panel 316 (step S152). Upon selection of a postcard type on this screen (b) (step S153), the setting process is terminated since there is no need to select a sheet type. When the sheet size is selected on the screen (a) of FIG. 6, the sheet type selecting screen (c) of FIG. 7 is displayed on the touch panel 316, asking the user to select a sheet type on the same screen (c). Since conditions for displaying these screens are similar to those for the first embodiment, their description is omitted.

Operations to be performed after the selection of the sheet size with a depression of the OK button are similar to those of the first embodiment, except that the displayed screen returns to the sheet selecting screen when popping up another screen during display of any of the copy basic screen, copy application mode screen, and sheet selecting screen (displayed by depressing the sheet selecting button on the copy basic screen). Further, the sheet size for the job is automatically selected as that for the device, and the manual feed tray is also automatically assigned as the sheet cassette.

Next, a description will be given of screens displayed on the touch panel (liquid crystal display operating section) 316 when the operator designates the size and type of manual feeding sheet by a job for the digital copying machine according to the second embodiment, with reference to FIGS. 9 to 12 and to a flowchart shown in FIG. 16.

FIGS. 9 to 12 are views showing examples of screens displayed on the touch panel 316 to designate sheet size and type for manual feeding by a job, and FIG. 16 is the flowchart showing a flow of a process of designating sheet size and type for manual feeding as a job. The control section 109 executes the process shown in the flowchart of FIG. 16, in which steps common to FIG. 14, referred to above, are designated by the same step numbers, and their description is omitted or simplified. The steps S141 to S145 and the step S148 are identical with those in the first embodiment.

Since the display control process executed when the sheet selecting key is depressed on the basic screen is identical with that in the first embodiment, its description is omitted.

A second cassette selecting key 606 is depressed to select a second sheet cassette for feeding of transfer sheets therefrom during printing. When the key 606 is depressed, a screen (b) of FIG. 10 appears, and the setting operation is terminated by depressing a close key. Since the functions performed by other keys 602 to 605 and 607 to 609 have already been described with reference to the first embodiment, their description is omitted.

When the [Reserve Change to Manual Feed] key 603 is depressed, the screen (c) shown in FIG. 11 is displayed on the touch panel 316 for setting sheet size. The user thus can select a desired sheet size from the regular A and B sizes or inch-based sizes. When "POSTCARD" is depressed (YES at a step S161) on this screen (c), the postcard type selecting screen (d) is displayed on the touch panel 316 (step S162). When the user selects a postcard type on this screen (d) (step S163), the setting operation is terminated here since there is no need to select a sheet type.

The screen (c) of FIG. 11 allows the user to set a sheet size for a job of designating manual feeding to be activated. When the sheet size is set, the screen (e) shown in FIG. 12 is then displayed (step S164). This screen (e) allows the user to set a sheet type for the same job. When the sheet type is set (step S165), the setting operation is terminated. Upon closing the [Designate Manual Feeding Sheet] screen, the sheet size/type icons (including the sheet orientation icon) are reflected in the [Manual Feed] key 604. The process of selecting the manual feed tray as the sheet feeding source for the job in question similarly applies as it does to the first embodiment.

As described above, according to the digital copying machine of the second embodiment, there are provided the reader section 103, facsimile section 106, and computer interface section 107 for inputting image data, the image memory 108 for sequentially storing the input image data, the printer section 104 for reading the stored image data from the image memory 108 to sequentially print hard copies of images on sheets, the operating section 102 capable of displaying the copy basic screen and the copy application mode screen, and the control section 109 for controlling the image memory 108 to sequentially store the input image data, and controlling the printer section 104 to sequentially print out the stored image data, and controlling the process of accepting a reservation of the next print job during printing, the process of storing a sheet or sheets for use per reserved job based on the designation of the sheet or sheets for feeding from the manual feed tray, the process of determining the type of the designated sheet or sheets at the time of execution of each job, and the process of printing hard copies in a manner according to the determined sheet type. Therefore, the digital copying machine according to the second embodiment can provide the following operations and results.

In the above configuration, when the user sets a sheet or sheets on the manual feed tray of the digital copying machine, the control section 109 displays the sheet size selecting screen on the touch panel 316 of the operating section 102. Then, the user designates a sheet size on the same screen. Responsive to the sheet size designation, the control section 109 then displays the sheet type selecting screen on the touch panel 316 of the operating section 102. The user now selects a sheet type on the same screen.

When the user depresses the sheet selecting key on the basic screen of the touch panel 316 of the operating section 102, the control section 109 displays, on the sheet selection screen, the screen related to paper (size/type/remaining sheets) set on the manual feed tray. When there is no sheet on the manual feed tray, the control section 109 displays the manual feeding icon and the remaining sheet number icon (displayed as empty), together with a message "THERE IS NO SHEET" on the touch panel 316 of the operating section 102. When there is a sheet or sheets on the manual feed tray, the operating section 109 displays the sheet size/type icons (including the paper orientation icon) designated on the manual feeding sheet designating screen, together with the manual feeding icon and remaining sheet number icon, on the touch panel 316 of the operating section 102.

The control section 109 then displays the screen allowing the user to set a sheet size for a manual feeding designating job to be activated, on the touch panel 316 of the operating section 102. When the user sets the sheet size, the control section 109 displays the screen requesting the user to select a sheet type for the same job on the touch panel 316 of the operating section 102. When the user has designated the sheet size and type, the setting process is terminated.

Therefore, in the second embodiment, when a sheet or sheets are being fed or to be fed from the manual feed tray during printing or for a reserved print job, or when the manual feed tray is being used by the preceding print job, the user can designate a sheet or sheets to be set on the manual feed tray for a print job or print jobs to be reserved. For example, by designating the size and type of sheets such as a postcard, OHP sheet, and thick sheet for printing jobs to be reserved, the digital copying machine can smoothly process printing through manual feeding in different manners according to a plurality of jobs, whereby the printing can be performed efficiently.

Although a copying machine is taken as an example in each of the above described embodiments, the present invention is not limited to this, but may be applied to printers, or complex copying machines or the like having copy/printer/facsimile functions or the like. Thus, the above embodiments may be configured for application to printers and complex copying machines or the like. In this case, the above described processes may apply similarly to these complex copying machines when they perform printing for the print/facsimile modes, in addition to the copy mode.

Further, although the case where the copying machine is connected to a single PC/WS is taken as an example in each of the above described embodiments, the present invention is not limited to this, but may be applied to the case where a plurality of copying machines (or printers or complex copying machines) and PCs/WSs are interconnected via a network, or to the case where a plurality of copying machines, printers, complex copying machines, and PCs/WSs are interconnected via a network.

The present invention may be applied to a system constructed of a plurality of devices, or to an apparatus constructed of a single device. It goes without saying that the object of the present invention can be attained by supplying a storage medium storing program codes of software for performing the above described functions of the embodiments to the system or the apparatus and causing a computer (or a CPU or a MPU) of the system or the apparatus to read and execute the program codes stored in the storage medium.

In this case, the program codes read from the storage medium implement the above described functions of the embodiments, and thus the storage medium storing such program codes constitutes the invention. The storage medium for supplying the program codes includes, for example, a floppy disk, a hard disk, an optical disk, a magneto-optical disk, a CD-ROM, a CD-R, a magnetic tape, a nonvolatile memory card, and a ROM.

Further, the above described functions of the embodiments may be implemented by the computer when the computer executes the program codes by reading them. Additionally, it goes without saying that the present invention includes the case where the above described functions of the embodiments are implemented by an operating system or the like operating on the computer when the operating system or the like actually performs all or part of the processes based on instructions given by the program codes.

Still further, it goes without saying that the present invention also includes the case where the above described functions of the embodiments are implemented when the program codes read from the storage medium are written into a memory provided on an expanded board inserted into the computer or an expanded unit connected to the computer and then, a CPU or the like provided on the expanded board or the expanded unit actually performs all or part of the processes based on instructions given by the program codes stored in the memory.

Figure 18:
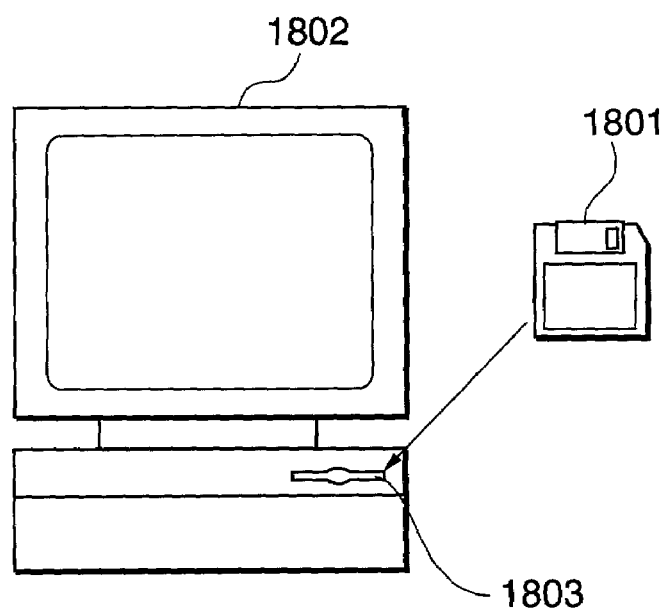
FIG. 18 is a view showing an example of the concept of supplying the apparatus with the program and related data for executing the sheet feeding source designation control method and the image formation control method of the invention from the storage medium.

FIG. 18 is a view showing an example of the concept of supplying the program and related data for executing the sheet feeding source designation control method (first embodiment) or the image formation control method (second embodiment) from the storage medium to the apparatus. The program and related data for executing the sheet feeding source designation control method or the image formation control method of the invention are supplied by inserting a storage medium 1801, such as a floppy disk or a CD-ROM, into a storage medium drive slot 1803. Then, the program and related data for executing the sheet feeding source designation control method or the image formation control method of the invention are once installed to a hard disk from the storage medium 1801 and then loaded from the hard disk to a RAM, or directly loaded to the RAM without being installed to the hard disk, whereby the program and related data of the invention can be executed.

In this case, to execute the program for executing the sheet feeding source designation control method or the image formation control method of the invention in the digital copying machine according to each of the embodiments of the invention, the program and related data are supplied to the digital copying machine through an apparatus, such as a computer 1802 described with reference to FIG. 18, for example, or the program and related data are stored in the digital copying machine in advance, whereby the program can be executed.

Figure 17:
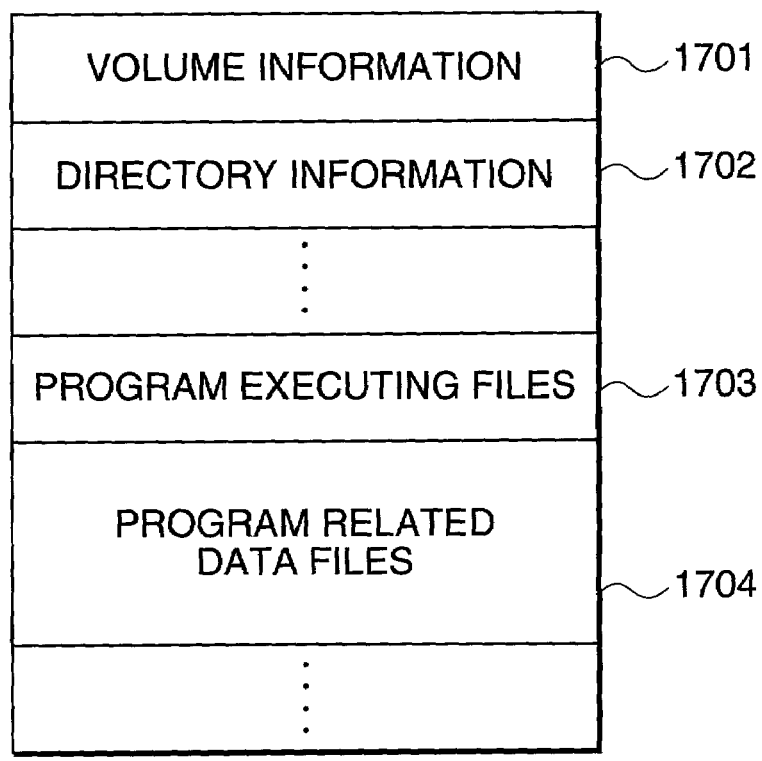
FIG. 17 is a view showing an example of the configuration of stored contents in a storage medium having a program and related data stored for executing a sheet feeding source designation control method and an image formation control method of the invention.

FIG. 17 is a view showing an example of the configuration of contents in the storage medium storing the program and related data for executing the sheet feeding source designation control method or the image formation control method of the present invention. The storage medium according to the present invention includes, for example, volume information 1701, directory information 1702, program executing files 1703, and program related data files 1704. The program according to the present invention is obtained by coding these information and data based on the above described controlling procedures designed for the digital copying machine.

What is claimed is:

1. An image forming apparatus for forming images on sheets based on an image input operation, comprising:
    a manual sheet feeding unit that manually feeds sheets;
    a sheet designating unit that designates sheet information of the sheets fed by said manual sheet feeding unit;
    a sheet information storing unit that stores the sheet information designated by said sheet designating unit;
    a display unit that displays screens; and
    a controller that causes said display unit to display a screen displaying sheet information and causes said display unit to change the screen displaying the sheet information to a screen displaying the designated sheet information and sheet information which a user is allowed to change after completion of the designation of the sheet information by said sheet designating unit.

2. An image forming apparatus according to claim 1, further comprising:
    an automatic sheet feeding unit that automatically feeds sheets, and
    wherein:
    the sheet information which the user is allowed to change includes sheet information of sheets fed by said automatic sheet feeding unit, and
    said controller allows the user to change said manual sheet feeding unit to said automatic sheet feeding unit as a sheet feeding source.

3. An image forming apparatus according to claim 1, further comprising:
    an image input unit that inputs image data;
    an image storing unit that sequentially stores the image data input by said image input unit;
    an image output unit that reads the image data stored in said image storing unit to sequentially form images on sheets and output same; and
    a setting unit that sets a processing mode for processing the image data stored in said image storing unit,
    wherein said controller causes said image storing unit to sequentially store the image data input by said image input unit, and causes said image output unit to sequentially form and output the images.

4. An image forming apparatus according to claim 3, wherein said controller causes said image output unit to form and output images in a manner according to the sheet information including a size of the sheet and a type thereof.

5. An image forming apparatus according to claim 4, wherein said processing mode comprises a mode for implementing at least one function performed by said image forming apparatus, said sheet size includes regular A sizes including A3 and A4, regular B sizes including B4 and B5, and inch-based sizes, and said sheet type includes plain sheet, thick sheet, and OHP sheet.

6. An image forming apparatus according to claim 1, wherein the image forming apparatus is a copying machine having a copying function of reading images from originals to form images on sheets, further comprising:
   an image reading unit that reads images from originals; and
   an interface unit that performs data communication with external apparatuses.

7. An image forming apparatus according to claim 1, wherein the image forming apparatus is a printing apparatus, which includes a printer, having a printing function of forming images on sheets, further comprising:
   an interface unit that performs data communication with external apparatuses.

8. An image forming apparatus according to claim 1, wherein the image forming apparatus is a multifunction machine having a copying function, a printing function, and a facsimile function, further comprising:
   an image reading unit that reads images from originals;
   a facsimile communication unit that performs data communication via a telephone line; and
   an interface unit that performs data communication with external apparatuses.

9. A method of controlling designation of a sheet feeding source applied to an image forming apparatus for forming images on sheets based on an image input operation, the image forming apparatus having a manual sheet feeding unit that manually feeds sheets, the method comprising:
   a sheet designating step of designating sheet information of sheets fed by the manual sheet feeding unit;
   a sheet information storing step of storing the sheet information designated by said sheet designating step;
   a display step of displaying screens; and
   a control step of causing said display step to display a screen displaying sheet information and causes said display step to change the screen displaying the sheet information to a screen displaying the designated sheet information and sheet information which a user is allowed to change after completion of the designation of the sheet information in said sheet designating step.

10. A method of controlling designation of a sheet feeding source according to claim 9, wherein:
   said image forming apparatus comprises an automatic sheet feeding unit automatically feeding sheets;
   the sheet information which the user is allowed to change includes sheet information of the sheets fed by the automatic sheet feeding unit; and
   said control step allows the user to change the manual sheet feeding unit to the automatic sheet feeding unit as the sheet feeding source.

11. A method of controlling designation of a sheet feeding source according to claim 9, further comprising:
   an image input step of inputting image data;
   an image storing step of sequentially storing the image data input by said image input step;
   an image output step of reading the image data stored by said image storing step to sequentially form images on sheets and output same; and
   a setting step of setting a processing mode for processing the image data stored by said image storing step;
   wherein said control step causes said image storing step to sequentially store the image data input by said image input step, and causes said image output step to sequentially form and output the images.

12. A method of controlling designation of a sheet feeding source according to claim 11, wherein said control step causes said image output step to form and output images in a manner according to the sheet information including a size of the sheet and a type thereof.

13. A method of controlling designation of a sheet feeding source according to claim 12, wherein said processing mode comprises a mode for implementing at least one function performed by said image forming apparatus, said sheet size includes regular A sizes including A3 and A4, regular B sizes including B4 and B5, and inch-based sizes, and said sheet type includes plain sheet, thick sheet, and OHP sheet.

14. A method of controlling designation of a sheet feeding source according to claim 9, wherein the image forming apparatus is a copying machine having a copying function of reading images from originals to form images on sheets, further comprising:
   an image reading step of reading images from originals; and
   an interface step of data-communicating with external apparatuses.

15. A method of controlling designation of a sheet feeding source according to claim 9, wherein the image forming apparatus is a printing apparatus, which includes a printer, having a printing function of forming images on sheets, further comprising:
   an interface step of data-communicating with external apparatuses.

16. A method of controlling designation of a sheet feeding source according to claim 9, wherein the image forming apparatus is a multifunction machine having a copying function, a printing function, and a facsimile function, further comprising:
   an image reading step of reading images from originals;
   a facsimile communication step of data-communicating via a telephone line; and
   an interface step of data-communicating with external apparatuses.

17. An image forming system comprising an image forming apparatus for forming images on sheets based on an image input operation, and an external apparatus for data communication with said image forming apparatus, wherein said image forming apparatus comprises:
   a manual sheet feeding unit that manually feeds sheets;
   a sheet designating unit that designates sheet information of the sheets fed by said manual sheet feeding unit;
   a sheet information storing unit that stores the sheet information designated by said sheet designating unit;
   a display unit that displays screens; and
   a controller that causes said display unit to display a screen displaying sheet information and causes said display unit to change the screen displaying the sheet information to a screen displaying the designated sheet information and sheet information which a user is allowed to change after completion of the designation of the sheet information by said sheet designating unit,
   wherein said external apparatus has a function of transmitting image data to said image forming apparatus.

18. A computer-executable program for controlling designation of a sheet feeding source of an image forming apparatus for forming images on sheets based on an image input operation, the image forming apparatus having a manual sheet feeding unit that manually feeds sheets, the program executing a control method comprising:
- a sheet designating step of designating sheet information of the sheets fed by the manual sheet feeding unit;
- a sheet information storing step of storing the sheet information designated by said sheet designating step;
- a display step of displaying screens; and
- a control step of displaying, in the display step, a screen displaying sheet information and changing the screen displaying the sheet information to a screen displaying the designated sheet information and sheet information which a user is allowed to change after completion of the designation of the sheet information by said sheet designating step.

19. A storage medium storing a computer program for controlling designation of a sheet feeding source applied to an image forming apparatus for forming images on sheets based on an image input operation, the image forming apparatus having a manual sheet feeding unit that manually feeds sheets, the program comprising:
- a sheet designating module for designating sheet information of the sheets fed by the manual sheet feeding unit;
- a sheet information storing module for storing the sheet information designated by said sheet designating module;
- a display module for displaying screens; and
- a control module for causing said display module to display a screen displaying sheet information and causing said display module to change the screen displaying the sheet information to a screen displaying the designated sheet information and sheet information which a user is allowed to change after completion of the designation of the sheet information by said sheet designating module.

20. An image forming apparatus for forming images on sheets based on an image input operation, comprising:
- a manual sheet feeding unit that manually feeds sheets;
- a first sheet designation unit that designates first sheet information of the sheets fed by said manual sheet feeding unit during execution of a first image forming job;
- a second sheet designation unit that designates second sheet information of the sheets fed by said manual sheet feeding unit during execution of a second image forming job, the first sheet information and the second sheet information being independent from each other; and
- a controller responsive to the designation of the second sheet information by said second sheet designation unit, for providing control to prevent the designation of the second sheet information from affecting the first sheet information of the sheets fed during the execution of the first image forming job.

21. An image forming apparatus according to claim 20, wherein:
said controller allows said first sheet designation unit and said second sheet designation unit to designate the first sheet information and the second sheet information, respectively, the first sheet information and the second sheet information being different from each other.

22. An image forming apparatus according to claim 20, further comprising:
- a reservation accepting unit that accepts at least one reservation for at least one image forming job to be activated subsequently during image formation, said reservation accepting unit accepting the reservation for the second image forming job during the execution of the first image forming job; and
- a sheet information storing unit that stores at least the second sheet information;

wherein:
said second sheet designation unit designates the second sheet information based on the reservation for the second image forming job accepted by said reservation accepting unit; and
said controller is responsive to execution of the reserved second image forming job, for causing image forming output to be executed based on the second sheet information.

23. An image forming apparatus according to claim 20, further comprising:
- an image input unit that inputs image data;
- an image storing unit that sequentially stores the image data input by said image input unit;
- an image output unit that reads the image data stored in said image storing unit to sequentially form images on sheets and output same; and
- a setting unit that sets a processing mode for processing the image data stored in said image storing unit, and
wherein said controller causes said image storing unit to sequentially store the image data input by said image input unit, and causes said image output unit to sequentially form and output the images.

24. An image forming apparatus according to claim 23, further comprising a sheet feeding unit that mechanically feeds sheets, and
wherein said controller causes said image output unit to form and output images based on the designated at least one sheet even during image formation using the sheets fed by said sheet feeding unit.

25. An image forming apparatus according to claim 20, further comprising a display unit that display sheet information including at least one of a sheet size and a sheet type, and,
wherein said controller causes said display unit to display said sheet information for a manual sheet feeding job to be activated using said manual sheet feeding unit, and causes said display unit to display said sheet information of at least one sheet set on said manual sheet feeding unit.

26. An image forming apparatus according to claim 25, wherein said processing mode comprises a mode for implementing at least one function performed by said image forming apparatus, said sheet size includes regular A sizes including A3 and A4, regular B sizes including B4 and B5, and inch-based sizes, and said sheet type includes plain sheet, thick sheet, and OHP sheet.

27. An image forming apparatus according to claim 20, wherein the image forming apparatus is a copying machine having a copying function of reading images from originals to form images on sheets, further comprising:
- an image reading unit that reads images from originals; and
- an interface unit that performs data communication with external apparatuses.

28. An image forming apparatus according to claim 20, wherein the image forming apparatus is a printing apparatus, which includes a printer, having a printing function of forming images on sheets, further comprising:

an interface unit that performs data communication with external apparatuses.

29. An image forming apparatus according to claim 20, wherein the image forming apparatus is a multifunction machine having a copying function, a printing function, and a facsimile function, further comprising:
an image reading unit that reads images from originals;
a facsimile communication unit that performs data communication via a telephone line; and
an interface unit that performs data communication with external apparatuses.

30. A method of controlling image formation applied to an image forming apparatus for forming images on sheets based on an image input operation, the image forming apparatus having manual sheet feeding unit that manually feeds sheets, the method comprising:
a first sheet designation step of designating first sheet information of the sheets fed by the manual sheet feeding unit during execution of a first image forming job;
a second sheet designation step of designating second sheet information of the sheets fed by the manual sheet feeding unit during execution of a second image forming job, the first sheet information and the second sheet information being independent from each other; and
a control step of providing control to prevent the designation of the second sheet information from affecting the first sheet information of the sheets fed during the execution of the first image forming job in response to the designation of the second sheet information in said second sheet designation step.

31. A method of controlling image formation according to claim 30, wherein:
said control step allows said first sheet designation step and said second sheet designation step to designate the first sheet information and the second sheet information, respectively, the first sheet information and the second sheet information being different from each other.

32. A method of controlling image formation according to claim 30, further comprising:
a reservation accepting step of accepting at least one reservation for at least one image forming job to be activated subsequently during image formation, said reservation accepting step accepting the reservation for the second image forming job during the execution of the first image forming job; and
a sheet information storing step of storing at least the second sheet information,
wherein:
said second sheet designation step designates the second sheet information based on the reservation for the second image forming job accepted in said reservation accepting step, and
said control step causes image forming output to be executed based on the second sheet information in response to the execution of the reserved second image forming job.

33. A method of controlling image formation according to claim 30, further comprising:
an image input step of inputting image data;
an image storing step of sequentially storing the image data input by said image input step;
an image output step of reading the image data stored by said image storing step to sequentially form images on sheets and output same; and a setting step of setting a processing mode for processing the image data stored by said image storing step,
wherein said control step causes said image storing step to sequentially store the image data input by said image input step, and causes said image output step to sequentially form and output the images.

34. A method of controlling image formation according to claim 33, further comprising:
a sheet feeding step of mechanically feeding sheets, and
wherein said control step causes said image output step to form and output images based on the designated at least one sheet even during image formation using the sheets fed by said sheet feeding step.

35. A method of controlling image formation according to claim 30, further comprising:
a display step of displaying sheet information including at least one of a sheet size and a sheet type, and
wherein said control step causes said display step to display said sheet information for a manual sheet feeding job to be activated using the manual sheet feeding unit, and causes said display step to display said sheet information of at least one sheet set on the manual sheet feeding unit.

36. A method of controlling image formation according to claim 35, wherein said processing mode comprises a mode for implementing at least one function performed by said image forming apparatus, said sheet size includes regular A sizes including A3 and A4, regular B sizes including B4 and 35, and inch-based sizes, and said sheet type includes plain sheet, thick sheet, and OHP sheet.

37. A method of controlling image formation according to claim 30, wherein the image forming apparatus is a copying machine having a copying function of reading images from originals to form images on sheets, further comprising:
an image reading step of reading images from originals; and
an interface step of data-communicating with external apparatuses.

38. A method of controlling image formation according to claim 30, wherein the image forming apparatus is a printing apparatus, which includes a printer, having a printing function of forming images on sheets, further comprising:
an interface step of data-communicating with external apparatuses.

39. A method of controlling image formation according to claim 30, wherein the image forming apparatus is a multifunction machine having a copying function, a printing function, and a facsimile function, further comprising:
an image reading step of reading images from originals;
a facsimile communication step of data communicating via a telephone line; and
an interface step of data-communicating with external apparatuses.

40. An image forming system comprising an image forming apparatus for forming images on sheets based on an image input operation, and an external apparatus for data communication with said image forming apparatus, wherein said image forming apparatus comprises:
a manual sheet feeding unit that manually feeds sheets;
a first sheet designation unit that designates first sheet information of the sheets fed by said manual sheet feeding unit during execution of a first image forming job;
a second sheet designation unit that designates second sheet information of the sheets fed by said manual sheet feeding unit during execution of second image forming job, the first sheet information and the second sheet information being independent from each other; and a controller responsive to the designation of the second sheet information by said second sheet designation unit, for providing control to prevent the designation of the second sheet information from affecting the first sheet information of the sheets fed during the execution of the first image forming job, wherein said external apparatus has a function of transmitting image data to said image forming apparatus.

41. A computer-executable program for controlling image formation in an image forming apparatus for forming images on sheets based on an image input operation, the image forming apparatus having manual sheet feeding unit that manually feeds sheets, the program executing a control method comprising:

a first sheet designation step of designating first sheet information of the sheets fed by the manual sheet feeding unit during execution of a first image forming job;

a second sheet designation step of designating second sheet information of the sheets fed by the manual sheet feeding unit during execution of a second image forming job, the first sheet information and the second sheet information being independent from each other; and a control step of providing control to prevent the designation of the second sheet information from affecting the first sheet information of the sheets fed during the execution of the first image forming job in response to the designation of the second sheet information by said second sheet designation step.

42. A storage medium storing a computer-executable program for controlling image formation in an image forming apparatus for forming images on sheets based on an image input operation, the image forming apparatus having manual sheet feeding unit that manually feeds sheets, the program comprising:

a first sheet designation module for designating first sheet information of the sheets fed by the manual sheet feeding unit during execution of a first image forming job;

a second sheet designation module for designating second sheet information of the sheets fed by the manual sheet feeding unit during execution of a second image forming job, the first sheet information and the second sheet information being independent from each other; and a control module for providing control to prevent the designation of the second sheet information from affecting the first sheet information of the sheets fed during the execution of the first image forming job in response to the designation of the second sheet information by said second sheet designation module.

* * * * *